US010320813B1

(12) United States Patent
Ahmed et al.

(10) Patent No.: US 10,320,813 B1
(45) Date of Patent: Jun. 11, 2019

(54) THREAT DETECTION AND MITIGATION IN A VIRTUALIZED COMPUTING ENVIRONMENT

(71) Applicant: Amazon Technologies, Inc., Seattle, WA (US)

(72) Inventors: Khaja Ehteshamuddin Ahmed, Bellevue, WA (US); Anthony Joseph Suarez, Seattle, WA (US); Dmitry Petrovich Andreychuk, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/701,455

(22) Filed: Apr. 30, 2015

(51) Int. Cl.
*H04L 29/06* (2006.01)
*G06N 20/00* (2019.01)

(52) U.S. Cl.
CPC ......... *H04L 63/1416* (2013.01); *G06N 20/00* (2019.01)

(58) Field of Classification Search
CPC .......................... H04L 63/1416; G06N 99/005
USPC ........................................................... 726/23
See application file for complete search history.

(56) References Cited

U.S. PATENT DOCUMENTS

| 8,832,832 | B1 * | 9/2014 | Visbal | H04L 63/1441 |
| | | | | 726/22 |
| 9,363,282 | B1 * | 6/2016 | Yu | H04L 63/1425 |
| 2003/0051026 | A1 | 3/2003 | Carter et al. | |
| 2004/0015719 | A1 | 1/2004 | Lee et al. | |
| 2005/0144480 | A1 | 6/2005 | Kim et al. | |
| 2007/0074272 | A1 | 3/2007 | Watanabe | |
| 2007/0094491 | A1 | 4/2007 | Teo et al. | |
| 2008/0033672 | A1 * | 2/2008 | Gulati | B82Y 10/00 |
| | | | | 702/69 |
| 2008/0098476 | A1 * | 4/2008 | Syversen | H04L 63/0227 |
| | | | | 726/23 |
| 2009/0265778 | A1 * | 10/2009 | Wahl | H04L 63/1416 |
| | | | | 726/13 |
| 2010/0007489 | A1 | 1/2010 | Misra et al. | |
| 2011/0023114 | A1 * | 1/2011 | Diab | G06F 9/4856 |
| | | | | 726/22 |

(Continued)

*Primary Examiner* — Jason K Gee
*Assistant Examiner* — Dereena T Cattungal
(74) *Attorney, Agent, or Firm* — Robert C. Kowert; Meyertons, Hood, Kivlin, Kowert & Goetzel, P.C.

(57) ABSTRACT

A service provider may deploy a security threat detection and mitigation platform in a multi-tenant virtualization environment that includes pluggable data collection, data analysis, and response components. The data analysis components may apply machine learning techniques to generate (based on training data sets) and refine (based on subsequently received data sets and feedback about the resulting classifications) predictors configured to detect particular types of security threats, such as denial of service attacks, botnets, scans, or remote desktop attacks. A data collection layer may collect, filter, organize, and curate network packet traffic data, network packet header data, or other information emitted by computing instances or applications executing on them, and provide the curated data as streams to the analysis layer. A response layer may automatically take action in response to threat detections (which may be overridden by an administrator) and may store classification data for subsequent analysis, feedback, and predictor refinement.

22 Claims, 16 Drawing Sheets

(56) References Cited

U.S. PATENT DOCUMENTS

| | | | |
|---|---|---|---|
| 2011/0060956 A1* | 3/2011 | Goldsmith | H04B 7/024 |
| | | | 714/746 |
| 2011/0214157 A1* | 9/2011 | Korsunsky | G06F 21/55 |
| | | | 726/1 |
| 2011/0225644 A1 | 9/2011 | Pullikottil et al. | |
| 2014/0059683 A1* | 2/2014 | Ashley | G06F 21/552 |
| | | | 726/23 |
| 2014/0223555 A1 | 8/2014 | Sanz Hernando et al. | |
| 2014/0289856 A1 | 9/2014 | Jiang et al. | |
| 2015/0355957 A1* | 12/2015 | Steiner | G06F 11/0772 |
| | | | 714/37 |
| 2016/0087861 A1* | 3/2016 | Kuan | H04L 43/065 |
| | | | 709/224 |
| 2016/0164886 A1* | 6/2016 | Thrash | H04L 63/14 |
| | | | 726/23 |
| 2016/0191545 A1* | 6/2016 | Nanda | H04L 43/062 |
| | | | 726/1 |
| 2016/0212012 A1* | 7/2016 | Young | H04L 41/14 |

* cited by examiner

THREAT DETECTION AND MITIGATION IN A VIRTUALIZED COMPUTING ENVIRONMENT

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. Examples of such large-scale systems include online merchants, internet service providers, online businesses such as photo processing services, corporate networks, cloud computing services (including high-performance computing services for executing large and/or complex computations), web-based hosting services, etc. These entities may maintain computing resources in the form of large numbers of computing devices (e.g., thousands of hosts) which are housed in geographically separate locations and which are configured to process large quantities (e.g., millions) of transactions daily or even hourly.

The advent of virtualization technologies for commodity hardware has provided benefits with respect to managing large-scale computing resources for many customers with diverse service needs, allowing various computing resources and services to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Security threat detection and mitigation in distributed computing environments (including in some virtualized computing environments) is typically performed using a disjointed collection of individual security mechanisms having separate infrastructures, work flows, data collection approaches, and/or ticketing systems for tracking and resolving security related issues. In many systems, manual responses (such as a human being shutting down a computing resource instance or throttling its traffic in response to receiving an alert message) are required in order to mitigate (or attempt to mitigate) some or all of the security threats that are detected. In addition, systems that employ fragmented approaches to threat detection and mitigation can be difficult to modify, tune, and update, and often lack visibility and scalability.

Figure 1:
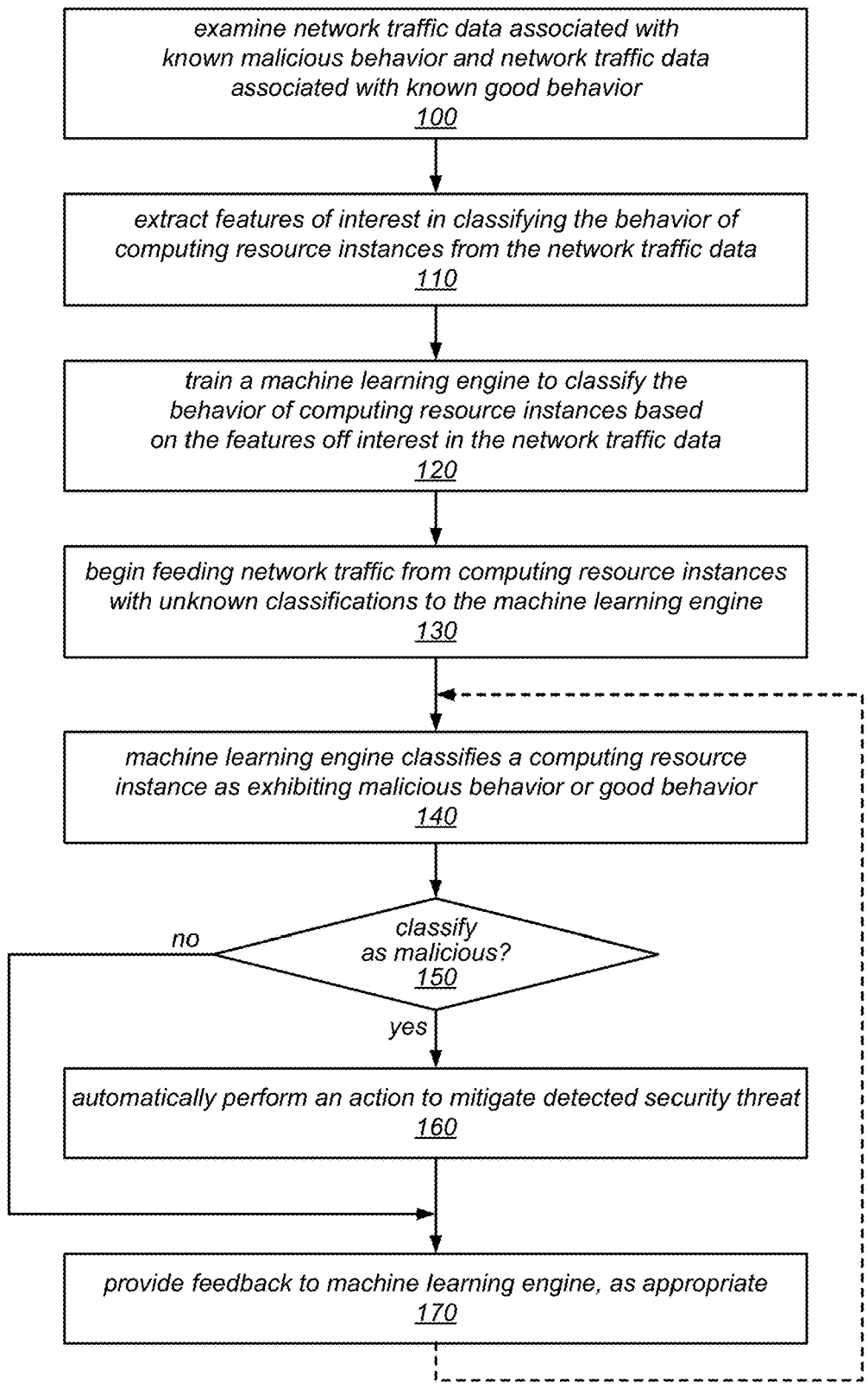
FIG. 1 is a flow diagram illustrating one embodiment of a method for applying machine learning techniques to classify the behavior of network endpoints (e.g., computing resource instances).

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Various embodiments of methods and apparatus for implementing security threat detection and mitigation in a virtualized computing environment are described herein. In some embodiments, a security threat detection and mitigation platform may employ machine learning and machine models to understand and classify the behavior of network endpoints (e.g., an IP address, host, machine, or anything else on a network) or to otherwise characterize a machine, computing resource instance, or endpoint based, for example, on behavior that is visible in the form of traffic that is emitted from that machine, instance, or endpoint. In some embodiments, the classification may not depend on the contents of the traffic (which may not be visible), but on the patterns observed in the traffic, e.g., how many packets were sent and/or received, the sizes of the packets, to source and destination IP addresses and ports, etc. Based on this and/or other information (e.g., information about host machines, context metadata, or other types of system telemetry, examples of which are described herein), the security threat detection and mitigation platform (sometimes referred to herein simply as a "security platform") may apply machine learning techniques to classify a communication as being malicious or "good" (e.g., "normal", "benign", or "acceptable"), and may classify malicious behavior as representing a specific type of security threat.

As described in more detail herein, the security threat detection and mitigation platform may include a variety of data collection components, data analysis components (e.g., inference engines), and response components, and its functionality may be extended by introducing additional data collection, data analysis, and/or response components (e.g., to collect different types of security-related data and/or detect additional types of security threats). The security platform may collect multiple types data in addition to (or instead of) network traffic data, and may feed that data (or data streams derived from that data) to multiple inference engines, each of which is configured to detect security threats of different type (or to detect similar types of security threats using different approaches). For example, the particular data stream that is directed to each of the inference engines may represent a statistical-analysis-driven digest of the collected data that has been determined to be usable in classifying a machine, instance, or endpoint (or its behavior as represented by a detected event) with respect to a specific type of security threat. Note that, while the functionality and architecture of the security threat detection and mitigation platform are described herein with respect to example security threats that may be detected through observation and recognition of network traffic patterns, other types of security threats may be detected and mitigation by the security platform, in other embodiments.

In some embodiments, the security threat detection and mitigation platforms described herein may be implemented by a service provider that provides virtualization services to customers. For example, the service provider may host virtual computing resource instances (e.g., virtual compute nodes and/or virtualized storage) on fleets of physical computing and storage devices. In such embodiments, data may be generated by internal services on the service provider network and/or by the virtual computing resource instances (or applications executing thereon), e.g., by (or on) a variety of droplet components, control plane services, and/or data pipeline processors. For example, these data sources may include a monitoring/metering service, an authorization service, a service that extracts packet header information from network traffic, in some embodiments, or a service that generates telemetry on particular events. In some embodiments, human actors that record their actions and conclusions in various services (e.g., ticketing services or other issue resolution services) may also generate data. Any or all of this data may lend itself to analysis that facilitates timely detection of malicious behavior, in different embodiments.

In some cases, network traffic patterns may clearly identify the nature of communication. For example, network traffic patterns may be used to identify egress denial of service (DoS) attacks, and this observation may be used by of the inference engines of a security threat detection and mitigation platform to detect and mitigate such attacks. More specifically, for every 5-tuple (source IP address, source port, destination IP address, destination port, protocol) the following statistics may uniquely identify the nature of the communication: average packet size in each direction, average time gap between packets, ratio of inbound to outbound packets. In other words, these statistics are measurably different for different types of communication and, in at least some systems, may constitute a "fingerprint" for some or all of the following types of communication: Web browsing, email, voice over IP (VoIP), video, application layer to database communication, database server to storage fabric communication, a slowloris attack, a DoS attack using a flood of SYN requests, a DOC attack using a flood of packets containing UDP datagrams, scanning of ports on a host, scanning of a port or ports across hosts, and/or a low denial of service (LDoS) attack, among others. The security platform may maintain (and add to) a library of such fingerprints for different types of traffic, classifying them and categorizing them as being malicious or benign, and may check data streams (e.g., suspicious data streams or samples of unclassified data streams) that are fed to the security platform against them within threat-type-specific inference engines, at least some of which employ machine learning techniques to improve classification results.

In some embodiments, the security platform (or various inference engines thereof) may classify the behavior of computing resources instances using simple rules and heuristics that are applied against telemetry collected from other services, which may provide an initial indication that an instance is acting as an attacker (e.g., that its behavior is malicious and represents a security threat). In some cases, given an initial indication or suspicion that an attack is underway, collecting and analyzing a sample of traffic statistics for several hundred milliseconds may aid in positive identification of the corresponding instance as being hostile or benign.

In various embodiments, a service provider that implements a security threat detection and mitigation platform such as those described herein may offer security threat detection and mitigation (or prevention) services to internal customers (e.g., other services implemented in the service provider environment) and/or to external customers (e.g., customers of or subscribers to virtualized computing services that are implemented on the service provider network). The security platform (and services provided thereby) may be extensible and may be configured to detect and mitigate threats in the context of the complex data generated and consumed in security operations, the variety and combinations of actions that may be taken to mitigate risk, and the diversity of malicious behavior that may be directed to service provider environments (including those that provide virtualization services). As described in more detail herein, in various embodiments, the security platform may gather, pre-process, and serve data to data analysis modules that can draw inferences from the data; may enable those data analysis modules to take actions based on events; and may include a base set of data analysis modules that detect and mitigate (e.g., block) particular types of malicious activity. The security platform may enable services and/or modules built on the platform to detect anomalous and/or malicious activities, and (automatically) take corrective action and/or instigate human intervention where automated correction with zero error is not possible.

Unlike in some existing systems, the systems described herein may include security threat detection and mitigation platforms that provide security threat detection that is extensible to meet growing demand and automated mitigation responses, while being scalable and flexible. In some embodiments, security applications such as host intrusion detection systems and/or network intrusion detection systems may execute on the security platforms, and may leverage any or all of the security threat detection and mitigation techniques described herein. The use of the security platforms described herein may reduce number of different security applications needed to protect customers from security threats in existing system, which may also reduce maintenance efforts, eliminate code and logic duplication, and simplify configuration and deployment of additional functionality (e.g., additional inference engines) through its modular design. In some embodiments, the security platform may be configured to aggregate and correlate data collected across a service provider network (e.g., a data center that provides virtualization services) from various sensors, and different security components (e.g., inference engines) may operate on top of the same data streams, making it easy to introduce new ones. In some embodiments, the data collected by the security platform may be made easily accessible to agents (e.g., security agents executing in the service provider environment) and automated tools (e.g., a machine learning service) for subsequent analysis and refinement of the classifications rendered by the security platform. In some embodiments, the security platform may implement a unified data collection model that facilitates the introduction of additional data collection components (e.g., new sensors), unified monitoring and alert systems, a common security model, and common deployment model, the collective use of which may provide better throughput (e.g., latency) for security threat detection and mitigation activities. In some embodiments, the security platform may provide customers the ability to perform offline data analysis and processing (correlation, pattern matching, machine learning, etc.) and to gather meaningful statistics (e.g., threats detected, false positive rates, automated vs. manual responses, etc.). In some embodiments, the security platform may provide a feedback loop to iteratively improve detection (e.g., through a machine learning approach). In some embodiments, the techniques and apparatus described herein may allow a security platform to gather data, assess security threats, and take appropriate actions to mitigate detected threats on a very large scale (e.g., in systems that include millions of computing resource instances generating on the order of one trillion events every few minutes).

In some embodiments, the machine learning techniques used by the security platforms described herein to infer whether network traffic is malicious or not may be dependent, at least in part, on observations of traffic patterns and other information (which may not require knowledge of the content of the packets). The machine learning techniques may include at least two distinct activities, the first being extracting the "features of interest" from the traffic patterns. For example, depending on the context and the type of security threat to be protected against, certain features of the traffic may be more important for use in security threat detection than others (e.g., packet size may be important in some case, packet frequency may be important in others, and/or the ratio of inbound packets to outbound packets may be important in still others). The second activity may be to train a machine model (e.g., a machine learning engine) based on training data sets that associated with known good and bad behavior. In other words, the machine model may be trained recognize the patterns (within the extracted data) that represent malicious behavior, and the patterns (within the extracted data) that represent good communication (e.g., benign behavior). Once the machine model has been training, it may be fed unknown (e.g., classified) traffic patterns and, based on its training, may classify the traffic as malicious, good, or indifferent (e.g., benign).

In some embodiments, if a malicious event takes place that is of a type for which there is not currently a machine model (or inference engine) implemented in the security platform, or if an existing machine model configured to detect events of that type failed to detect the event, the data collected and used in the (erroneous) classification of the behavior as benign may be used as a training set for a new machine model or to improve classifications made by an existing machine model. Conversely, if a machine model erroneously classifies an instance as exhibiting malicious behavior when, in fact, its behavior is acceptable (e.g., if the instance has been granted an exception to a prohibition on what would otherwise be considered malicious behavior, e.g., to test the security platform or for other reasons), the security platform may (based on feedback from the customer on whose behalf the incorrectly maligned instance is hosted or from an administrator) may create a "white list" feature or inference engine rule stating that the detected behavior is malicious unless a particular flag is set (e.g., a flag that is set on a per-instance basis to indicate that an instance is permitted to exhibit this type of behavior). In another example, if one of the inference engines incorrectly classifies an instance as exhibiting malicious behavior (e.g., based on a traffic pattern that is similar to, but not the same as, that of a malicious attack), a human (e.g., the customer or administrator) may override the classification decision, identifying the observed pattern as one that is not associated with the malicious attack. The inference engine may then learn from that feedback and may retrain the machine model for the inference engine to recognize the difference between the malicious and benign traffic patterns. In some embodiments, the security platform (through the application of machine learning techniques) may create a hyperplane that separates the cluster of instances exhibiting behavior that was previously being classified as malicious based on one traffic pattern from all other clusters of instances and a particular element of the cluster (e.g., an instance that exhibited similar, but not identical behavior that is not, in fact, malicious) from all other elements that were previously in that cluster.

One embodiment of a method for applying machine learning techniques to classify the behavior of network endpoints (e.g., computing resource instances) is illustrated by the flow diagram in FIG. 1. As illustrated at 100, in this example, the method may include examining network traffic data that is associated with known malicious behavior and network traffic data that is associated with known good behavior. The method may include extracting features of interest in classifying the behavior of computing resource instances from the network traffic data, as in 110.

As illustrated in this example, the method may include training a machine learning engine (e.g., a machine model) to classify the behavior of computing resource instances based on the features off interest in the network traffic data, as in 120. After training the model (e.g., using the training sets described above), the method may include beginning to feed network traffic from computing resource instances with unknown classifications to the machine learning engine, as in 130.

As illustrated in this example, the method may include the machine learning engine classifying a computing resource instance as exhibiting malicious behavior or good behavior, as in 140. If the behavior is classified as malicious, shown as the positive exit from 150, the method may include automatically performing an action to mitigate the detected security threat, as in 160. However, if the behavior is not classified as malicious (e.g., if the behavior is classified as "good", "normal", "benign", or "acceptable"), shown as the negative exit from 150, no such mitigation action may be needed or taken. In either case, the method may include provide feedback to machine learning engine, as appropriate (as in 170).

As illustrated in FIG. 1, the method may include repeating any or all of the operations illustrated as elements 140-160, as appropriate, while network traffic is fed to the machine learning engine. Note that in this and other examples described herein, any of a variety of machine learning techniques may be applied to the classification of machines, computing resource instances, network endpoints, and/or the behavior of machines, instances or endpoints, including, but not limited to linear regression techniques, logistic regression techniques, techniques that employ support vector machines (SVMs), k-means clustering, techniques for determining "k" in k-means clustering (e.g., determining the number of natural clusters that are represented in a data set), reinforcement learning techniques, and/or other types of supervised learning techniques or unsupervised learning techniques (including other types of cluster analysis techniques) that are suitable for performing binary classifications.

In various embodiments, the security threat detection and mitigation platforms described herein may provide core services such as a data service, a data analysis and classification service, and a response service, and these services may be independent and composable. In some embodiments, the architecture of the security platform itself may be reflective of these distinct types of core services. For example, the security platform may include (or may be thought of as including) a data collection layer, a data analysis layer, and a response layer, all of which are described in more detail below. Note that, in different embodiments, these layers may be structural (e.g., the physical components, or portions thereof, that implement the layers may be distinct from each other and/or may be dedicated to providing these distinct types of core services) or may be notional (e.g., they may be abstractions representing the physical and logical components, or portions thereof, that collectively provide these distinct types of core services). Note also that each of these layers may be further sub-divided into multiple physical or logical layers, components, or collections of components that provide specific services or perform specific operations in support of one or more services, in some embodiments.

As previously noted, the security threat detection and mitigation techniques described herein may in some embodiments be applied in service provider systems that implement a multi-tenant virtualization environment. One embodiment of a method for classifying the behavior of virtual computing resource instances in a multi-tenant environment is illustrated by the flow diagram in FIG. 2. As illustrated at 210, in this example, the method may include, in a multi-tenant virtualization environment, collecting data emitted by each virtual computing resource instance and/or collected for (or from) each instance by a respective security platform agent (e.g., an agent of a security-related utility or other service) during the execution of customer applications on the instances. The method may include inferring a classification for a given instance by applying rules generated based on training data sets and other data, as in 220. For example, an inference engine may apply rules that are generated and/or updated using machine learning techniques.

Figure 2:
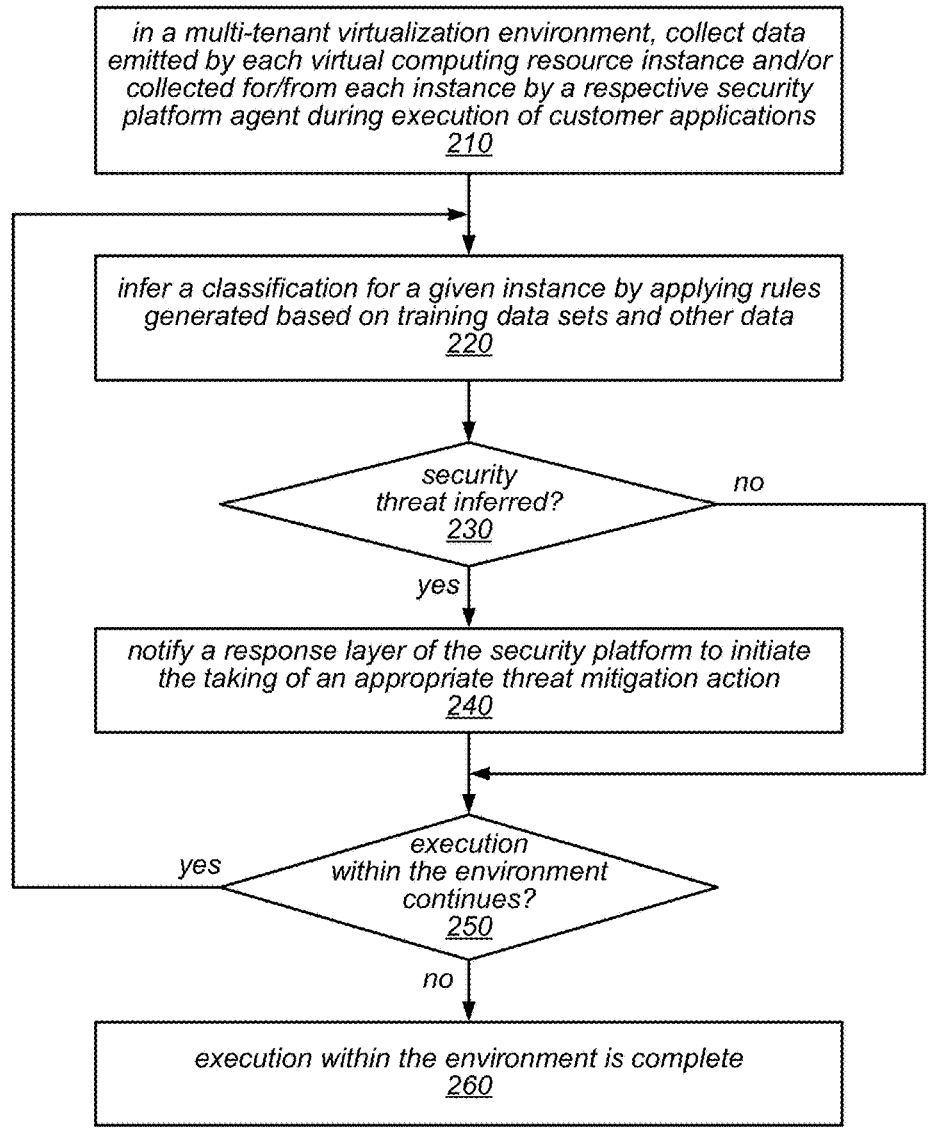
FIG. 2 is a flow diagram illustrating one embodiment of a method for classifying the behavior of virtual computing resource instances in a multi-tenant environment.

If a security threat is inferred, shown as the positive exit from 230, the method may include notifying a response layer of the security platform to initiate the taking of an appropriate threat mitigation action (e.g., automatically), as in 240. However, if no security threat is inferred, (shown as the negative exit from 230), or once appropriate action has been initiated to mitigate an inferred security threat (as in 240), the method may include repeating the operations shown as 220-240 while execution of applications on various virtual computing resource instances continues within the environment. This is illustrated in FIG. 2 by the feedback from the positive exit of 250 to 220, and by the path from the negative exit of 250 to 260.

In some embodiments, all of the data to be used in security threat detection and mitigation may be collected through a set of standard agents (e.g., sensors) in the data layer of the security platform and pre-processed by a set of standard receivers (e.g., collection and/or publishing components). For example, there may be agents of a monitoring or metering service running on customer computing resource instances or on droplets that are collecting network traffic data (e.g., they may capture packet sizes, source and destination IP addresses and ports, and/or other information to be used in security detection/mitigation and/or by a billing process). In another example, a flow logging service (which may obtain data from a monitoring/metering service, in some embodiments) may allow customers to determine the sources, destinations, and packets sizes or volumes for the communications in which their instances are involved. As described in more detail below, the data collected by the agents may be forwarded to a fleet of receivers, all of which operate the same protocol and forward pre-processed data to the same analysis layer (as a stream).

In some embodiments, rather than sending raw data streams that are collected by agents to the inference engines of the data analysis layer, the data streams fed to the inference engines may be statistical-analysis-driven digests of the collected data streams. In such embodiments, the system may first perform a statistical analysis of the incoming data streams. Through this analysis, the system may form the basis of a fingerprint to be extracted from the data streams (e.g., a fingerprint relative to a particular security threat). This fingerprint may then be fed to a machine model within an inference engine that is trained to recognize that fingerprint. In other words, based on a statistical analysis, different subsets, combinations, and/or aggregations of the available input data (e.g., various data streams or portions thereof, information about host machines, context metadata, and/or other types of system telemetry) may be fed to each of the inference engines in order to perform their respective classification operations. In some embodiments, the information fed to inference engines may include data indicative of system behaviors or characteristics, such as data usable to determine that a machine, computing resource instance, droplet, or network endpoint is hot (overloaded/oversubscribed), is underutilized (lightly loaded or undersubscribed), or is failing (e.g., exhibits too many memory read errors or write errors). For example, in some embodiments, the data may indicate the memory utilization or CPU utilization for a particular droplet (overall) or for an individual instance, the amount of traffic emitted by a particular droplet (overall) or for an individual instance, and/or the number of instances that are associated with a particular droplet. In response to detecting one of these characteristics, the platform may be configured to initiate a remediation workflow (e.g., one that takes action to prevent, mitigate, or correct a detected condition or event).

In some embodiments, the security platform (or a monitoring/metering service thereof) may provide filter logging data collection/ingestion capability and may serve the processed data as a stream (e.g., through a data stream processing service). This data may include relatively coarse-grained information about network traffic patterns observed on various computing resource instances. For example, in one embodiment, a filter logging data collection/ingestion service may summarize the network traffic statistics of interest (e.g., data indicating how many packets have been sent or received and the source and destination IP addresses and/or ports) once every minute, and may communicate that information (e.g., in multiple individual records, each corresponding to one minute) to the analysis layer once every ten minutes. In some embodiments, in order to achieve a higher confidence in the classifications made by the inference engines of the security platforms described herein than may be achieved when relying solely (or primarily) on coarse-grained data, additional finer-grained data may be collected and fed to the security platform. In some embodiments, a service (which may run on droplets on customer instances) may, when queried, return a TCP dump of packet headers for a subset of the network traffic associated with a given instance. For example, an inference engine, when confronted with an initial classification in which confidence is low may request the packets headers for every packet sent and/or received by a given instance during a small window of time (e.g., for the next five seconds or for the next ten seconds) or for a specific number of packets (e.g., for the next 100 packets sent or received by a given instance).

Other data communicated to the analysis layer may include data that may be relatively static (or that may change relatively infrequently compared to the frequency of network communications) and that may (or may not) be finer-grained than the network packet traffic information described above, may include information about customer accounts (e.g., information indicating instance ownership or indicating that an account and/or instances hosting on behalf of the account holder are in a suspect or compromised state), IP address ownership, instances that are deemed vulnerable to attack, IP/DNS reputation state changes, authorization events, and/or other objects in the network. In some embodiments, some or all of this type of relatively static information may be stored in a data warehouse (e.g., database or database service) and/or in a local cache and may subsequently be made available for querying and/or served by the filter logging data collection/ingestion service, as needed. In some embodiments, large blobs (e.g., large sets of training data or communication traffic data) may also be stored in and served from a data warehouse. In some embodiments the locations at which data is stored by the security platform may be abstracted away from customers or security platform component developers, who may only need to ask for the data (or a pointer to it) to access the data. In some embodiments, data retrieved from the data warehouse and/or from the filter logging data collection/ingestion service may be decompressed, processed (e.g., de-ionized) and put into a data stream for consumption by one or more inference engines in the analysis layer of the security platform, by other components of the security platform, or by other services implemented in the service provider environment. For example, the data may be retrieved in order to investigate and analyze data that is associated with events that have not previously been observed or that no inference engines have been configured to detect in order to create a machine model that can detect subsequent events of that type.

As noted above and described in more detail below, in some embodiments, the analysis layer of the security platform may include a set of standard receivers (e.g., collection and/or publishing components) and one or more inference engines, each configured to detect security threats of a specific type. For example, a collector service may detect newly added filter logging data packages and may feed their key names into a queuing service (e.g., to ensure idempotence). A publishing service may then pick up the key names from the queuing service, download the corresponding filter logging data packages, and publish individual records as a stream (e.g., through a data stream processing service). An inference engine (e.g., one that includes a local classification predictor generated and/or updated by a machine learning service, and then downloaded to the inference engine) may classify the stream as representing malicious or good behavior. For example, an inference engine that is configured to detect egress DoS attacks may consume the stream and test individual flow records within the stream using the local predictor of the inference engine to determine a classification for the observed behavior.

In some embodiments, after making an initial classification decision (or receiving a stream for which an initial classification has been determined), an inference engine may perform an analysis that is based, at least in part, on data that is finer-grained than the data in the network traffic data stream. For example, in edge cases in which the classification may not be clear (or in other cases in which confidence in the initial classification is low), more detailed information may be considered before making a final classification decision and notifying the response layer of the security platform with the result. In some embodiments, this fine-grained information may include packet header information that was obtained through a service that returns a TCP dump of packet headers for a subset of the network traffic associated with a given instance, as described above. For example, in one embodiment, an initial classification (e.g., one made by a component of the data collection layer) may indicate that the observed network traffic may represent a UDP flood type attack to a DNS server. In order to verify (or override) this initial classification, the inference engine that is configured to detect this type of attack may request, retrieve, and examine the packet header information to determine whether the behavior is, in fact, malicious. For example, in a typical attack of this type, the same request is made over and over again from different ports to the same DNS server. By examining the header information for a relatively small collection of individual packets (rather than relying on aggregate data), the inference engine may be able to determine that hundreds of requests of exactly the same size were directed to the DNS server and a corresponding number of responses of exactly the same size were received from the DNS server, indicating that an attack of this type is very likely to be in progress.

As noted above, in some embodiments, and for some types of security threats, multiple inferences engines may be employed (in combination) to determine a classification result with respect to those types of security threats. For example, the rules and/or algorithms of two or more inference engines may be applied in series to a data stream or collection of data streams by chaining an output of one inference engine to another inference engine as an input. In some embodiments, an initial classification result that is generated by one inference engine by applying heuristics or machine learning techniques to a particular data stream (or a portion of a data stream) may be fed to a second inference engine. For example, this first inference engine may operate on network traffic data to make an initial classification having a particular score (e.g., with a particular confidence level). The second inference engine may apply different heuristics or machine learning techniques to the output of the first inference engine and, in some cases, to additional input data to draw its own conclusion about the classification of the event that was detected by the first inference engine. The additional input data may include a different data stream or a different portion of the same data stream (e.g., packet header information or information extracted from the network traffic that is different than the information extracted and fed to the first inference engine), information emitted by a host machine or instance, context metadata, date or time information, or any other inputs suitable for further classifying the event or behavior that was detected by the first inference engine (e.g., to produce a classification result with a higher confidence level than that produced by the first inference engine). In some embodiments, the data analysis layer may include multiple inference engines that operate as a systolic array through which multiple data streams are pumped to classify the behavior of machines, instances, and endpoints and/or to classify events that are associated with those machines, instances, and endpoints.

In various embodiments, the response layer of the security platforms described herein may support a variety of types of responses to detected (or suspected) security threats, some of which may be performed automatically in response to detection of particular types of security threats. For example, a response to one type of event may be to perform a simple atomic action (e.g. "notify customer", or "shut down instance"), or it may include the initiation of a complex work flow that includes a series of actions (e.g., "throttle (or block) traffic with pattern X and notify customer, if no response is received within 24 hours, isolate the instance and notify the customer as well as an administrator and/or the security operations team." In another example, a response may include opening a ticket to record an event (e.g., the detection or suspicion of malicious behavior) and to request human intervention to verify the classification of the event, override the classification of the event, and/or perform one or more (manual) actions to mitigate the malicious behavior. In various embodiments, the security platform may also allow human review in cases in which an event or behavior is not classified as malicious, e.g., to audit the operation of the security platform and its inference engines and determine whether and when any changes should be made to the security platform or inference engines to improve the correctness of classification results. In various embodiments, any of a library of responses may be explicitly invoked (e.g., by the analysis layer, by a customer, or by an administrator) by calling the response service directly, or may be implicitly invoked (e.g., by generating an event that causes the response service to take a particular action).

Figure 3:
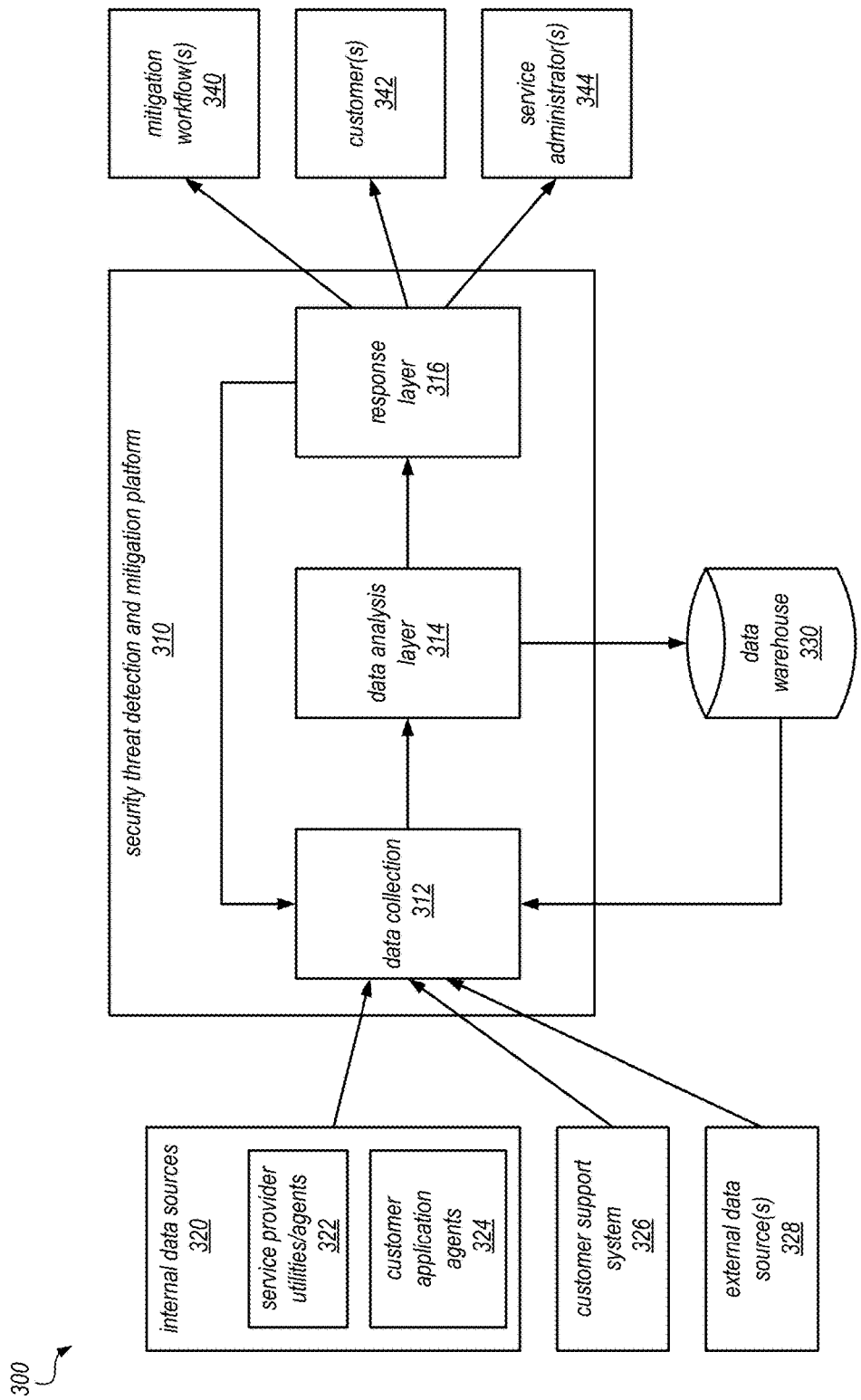
FIG. 3 is a block diagram illustrating a service provider environment that implements a security threat detection and mitigation service, according to at least some embodiments.

One embodiment of a service provider environment that implements a security threat detection and mitigation service is illustrated by the block diagram in FIG. 3. As illustrated in this example, service provider environment 300 may include a security threat detection and mitigation platform 310, which may include one or more data collection component(s) 312, a data analysis layer 314, and a response layer 316, which may trigger actions taken by one or more automated security threat mitigation workflow(s) 340, customer(s) 342, and/or service administrator(s) 344, as described herein.

As illustrated in this example, security threat detection and mitigation platform 310 may receive input data (e.g., sensor data from agents that is provided as streaming data, or other information) from any of a variety of sources, in different embodiments. For example, internal data sources 320 may include one or more service provider utilities or agents 322 and/or customer application agents 324. Other data sources may include a customer support system 326 and/or various external data source(s) 328.

As illustrated in this example, security threat detection and mitigation platform 310 may interact with a data warehouse 330 in service provider environment 300 to store classification data (which may include inferences made by one or more inference engines within data analysis layer 314 and/or the data steams used to draw those inferences). For example, some or all of the data streams may be stored in a data warehouse from which they may be retrieved for further analysis, to improve classification results, for forensics (e.g., to determine whether is it possible to create evidence of an undetected malicious event that can be used to detect that event in the future) and/or for auditing purposes. In some embodiments, data indicating inferences previously made, conclusions previously drawn, actions previously taken in response, and/or events previously observed may be data of interest that may shape and influence inferences made by the security platform in the future.

As described above, the security threat detection and mitigation platforms described herein may, in various embodiments, rely on large streams of coarse-grained data (e.g., filter logging data) that is generated by the service provider system that can be analyzed using machine learning techniques to provisionally identify malicious activity; and/or fine-grained data (e.g., TCP packet header dumps) or context data (e.g., IP address reputation information, instance reputation, account status information, account payment history, account fraud scores, instance risk scores, etc.) that can be requested, gathered and analyzed as needed to validate (or invalidate) classifications for which confidence is low. In some embodiments, high confidence classifications may be used to activate various remediation measures (e.g., automatically performing a mitigation response action, creating a ticket for human intervention, throttling traffic, shutting down an instance, notifying a customer, etc.) In some embodiments, the techniques described herein lend themselves to the creation of the security platforms having a three layer architecture that is flexible, extensible and scalable, and on which a suite of security tools and services may be built. The phases of the classification exercises performed by the security platform may be thought of as a coarse-grained data collection and streaming phase, an analysis performed in conjunction with fine-grained data, and a remediation (or response) phase.

In various embodiments, a service provider system that includes a central security threat detection and mitigation service, such as that described herein, may include any of all of the services and components illustrated in the figures and/or described herein. As previously noted the security platform may include a data layer that acquires data, aggregates the data and feeds to collector/publisher components, which pre-processes the data to refine, shape, and curate it for the use of the analysis layer. For example, depending on the size (e.g., the volume) of the data, it may need to organized as a stream (e.g., using a data stream processing service) or may (e.g., for coarser data sets) be sent directly to the analysis layer. In some embodiments, the monitoring/metering service that collects network packet traffic information handles data in extremely high volumes. In some embodiments, not all of this traffic may be fed to the analysis phase of the security platform. For example, traffic involving trusted internal service provider services communicating with each other may be filtered out and ignored for the purposes of security threat detection and mitigation, in some embodiments. In other words, the techniques described herein may primarily target the behavior of customer instances that communicate with entities outside of the service provider environment (e.g., outside of a virtualization environment that hosts the customer instances). In some embodiments, however, security threat detection and mitigation may be applied to protect privileged instances (e.g., those owned by the service provider rather than by external customers or service subscribers) that communicate with other internal servicer, external services, and/or other external entities (endpoints). Other types of data (e.g., data that is not very high volume nor rapidly changing, such as the IP/DNS reputation of an instance) may not be filtered at all (e.g., all of it may be stored or made available to the security platform, rather than discarding any of it).

In some embodiments, the security platform may include multiple sensors (e.g., devices, services, and/or processes that record events, that may make some determination of any potential maliciousness of the event, and that convey information about the event to the security service. For example, services implemented by the service provider may contain information that can convey useful input for the inference engines of the security platform, in some embodiments. The actors in the security platforms described herein may include devices, processes, and/or services that are able exercise control on network traffic, customer accounts, computing resource instances, droplets and/or other services. For example, they may exercise control by changing the configuration of a device, service, or process or via some other external network control mechanism (e.g. instructing an external service, dongle device, or droplet component to constrain traffic from an instance). In some embodiments, various security platform agents that are local to sensors and actors may provide some limited services locally. For example, such an agent may be configured to assess communication and initially classify it as malicious or not and, if necessary, initiate an action to block it.

In some embodiments, a data service of the security platform may aggregate information and/or telemetry received from sensors and agents, and may curate and organize this information (e.g., taking policy, historic records, and/or context into account), record assessments, and serve the information via streams or as stored and retrievable data (e.g., data stored in a database service or other data warehouse, in different embodiments). The response service of the security platform may provide an aggregated way of responding to malicious activity. For example, it may directly use available ticketing, notification, and/or control mechanisms and where necessary, compose from available capabilities sequences of actions that may be staged through a response workflow. In some embodiments, a data analysis module of the security platform may include an inference engine that consumes the data provided to it (or made available for retrieval by it) to identify unauthorized or malicious activity and may use various response service mechanisms to mitigate or contain the detected activity. In some embodiments, the internal workings of such modules may be considered (or treated as) black boxes by other components of the security platform. In some embodiments, the individual data analysis modules may be implemented as lightweight services, each of which focuses on identification of a single type of malicious activity (ingress DoS attacks, egress DoS attacks, botnet command and control systems, unauthorized network scans and probes, phishing, spamming, and/or other types of security threats. In some embodiments, a library of the security platform may provide an API that allows developers to access aggregated and served data in the security platform and to initiate actions via the response service. In some embodiments, agents and/or actors may be able to publish data directly to the data service using the security platform library.

Figure 4:
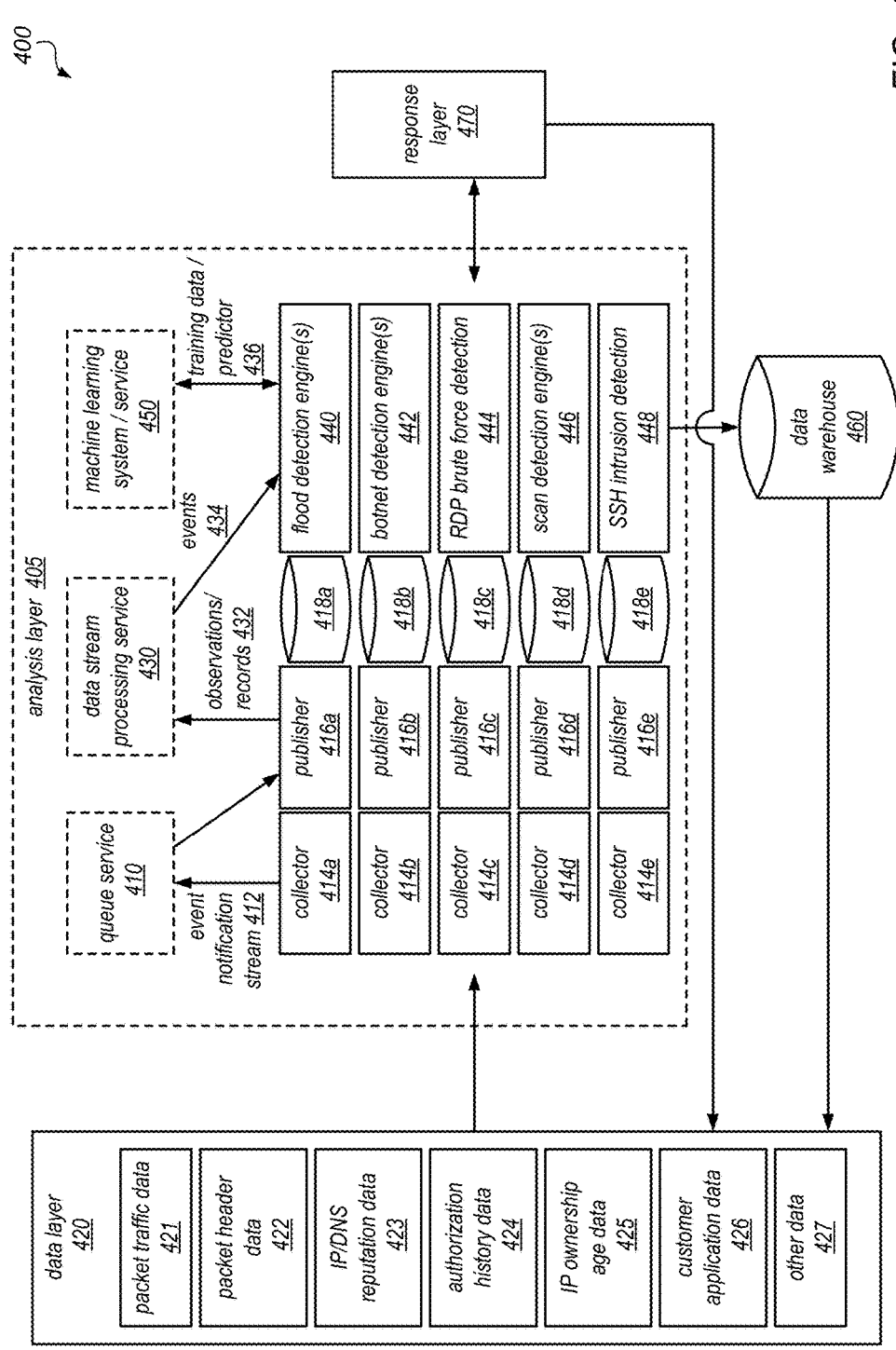
FIG. 4 is a block diagram illustrating a security threat detection and mitigation platform, according to at least some embodiments.

One embodiment of a security threat detection and mitigation platform is illustrated by the block diagram in FIG. 4. As illustrated in this example, security threat detection and mitigation platform 400 may include a data layer 420, an analysis layer 405, a response layer 470 and a data warehouse component 460, such as those described herein. In at least some embodiments, data layer 420 may collect, obtain, aggregate, and/or generate data usable as inputs to the operations of analysis layer 405. For example, data layer 420 may supply any of a variety of types of data including, but not limited to, packet traffic data 421, packet header data 422, IP address and/or Domain Name system reputation data (shown as IP/DNS reputation data 423), authorization history data 424, IP ownership age data 425, customer application data, 426, and/or other data 427. In some embodiments, packet traffic data 421 may be sent (periodically) to the analysis layer 405 by a monitoring service running on a respective droplet on each computing resource instance. For example, in one embodiment, the monitoring service may send, once every ten minutes, ten records, each containing data representing the number of packets the instance sent, the number of packets the instance received, and the IP addresses and ports to which and from packets were sent during one minute within the ten minute reporting window. In some embodiments, packet header data 422, which may be much more fine-grained than packet traffic data 421, may be provided by another service (one that is configured to provide TCP dumps of packet header data, including IP addresses and ports, and the number of bytes in each packet) for a specific subset of packets (e.g., packets received within a relatively small window of time or for a relatively small number of packets).

As illustrated in this example, the analysis layer 405 may include multiple collectors (shown as 414a-414e), multiple publishing components (shown as 416a-416e), multiple local storage components (e.g., database instances 418a-418e), and a variety of inference engines. As illustrated in this example, the inference engines may include, but are not limited to, one or more flood detection engines 440, one or more botnet detection engines 442 (e.g., which may include an inference engine to detect botnets command and control systems as well as inference engines to detect other types of potentially malicious botnets), a remote desktop attack (e.g., RDP brute force attack) detection engine, one or more scan detection engines (e.g., a port scan detection engine and/or a horizontal scan detection engine), and/or a secure shell intrusion detection engine. As described in detail herein, the analysis layer may also include (or interact with) a queue service 410, a data streaming service 430, and/or a machine learning system or service 450, in some embodiments.

In some embodiments, the collectors 414 and publishers 416 may work (together with a queue service) to filter, organize and/or curate the data, ultimately generating observations/records 432 and provide them (via data stream processing service 430) to various inference engines (as appropriate) as streams of events (shown as events 434). More specifically, any of collectors 414a-414e may receive inputs from data layer 420 (e.g., raw, filtered, or aggregated sensor data, packet information, or other types of input data illustrated in FIG. 4), and may perform pre-processing operations on the input data to generate an event notification stream 412, which is sent to queue service 410. The observations/records 432 may also be stored in respective ones of database instances 418a-418e for subsequent analysis, refining of the inference engines (through machine learning system/service 450), or for auditing or other purposes.

As illustrated this example, one or more of the inference engines 440-448 may receive the event stream 434 and may (e.g., by applying machine learning techniques and a machine model generated using those techniques) infer that the behavior of a computing resource instance (represented by an event) should be classified as malicious. An inference engine that makes such a determination may provide a notification to that effect to response layer 470, which may take appropriate action to mitigate the security threat. As illustrated in this example, the inference engine may also provide the event data and classification information to the machine learning system/service 450 and may receive an updated predictor (e.g., an updated machine model) to use in subsequent classification exercises. These interactions as illustrated in FIG. 4 as training data/predictor 436.

Figure 5:
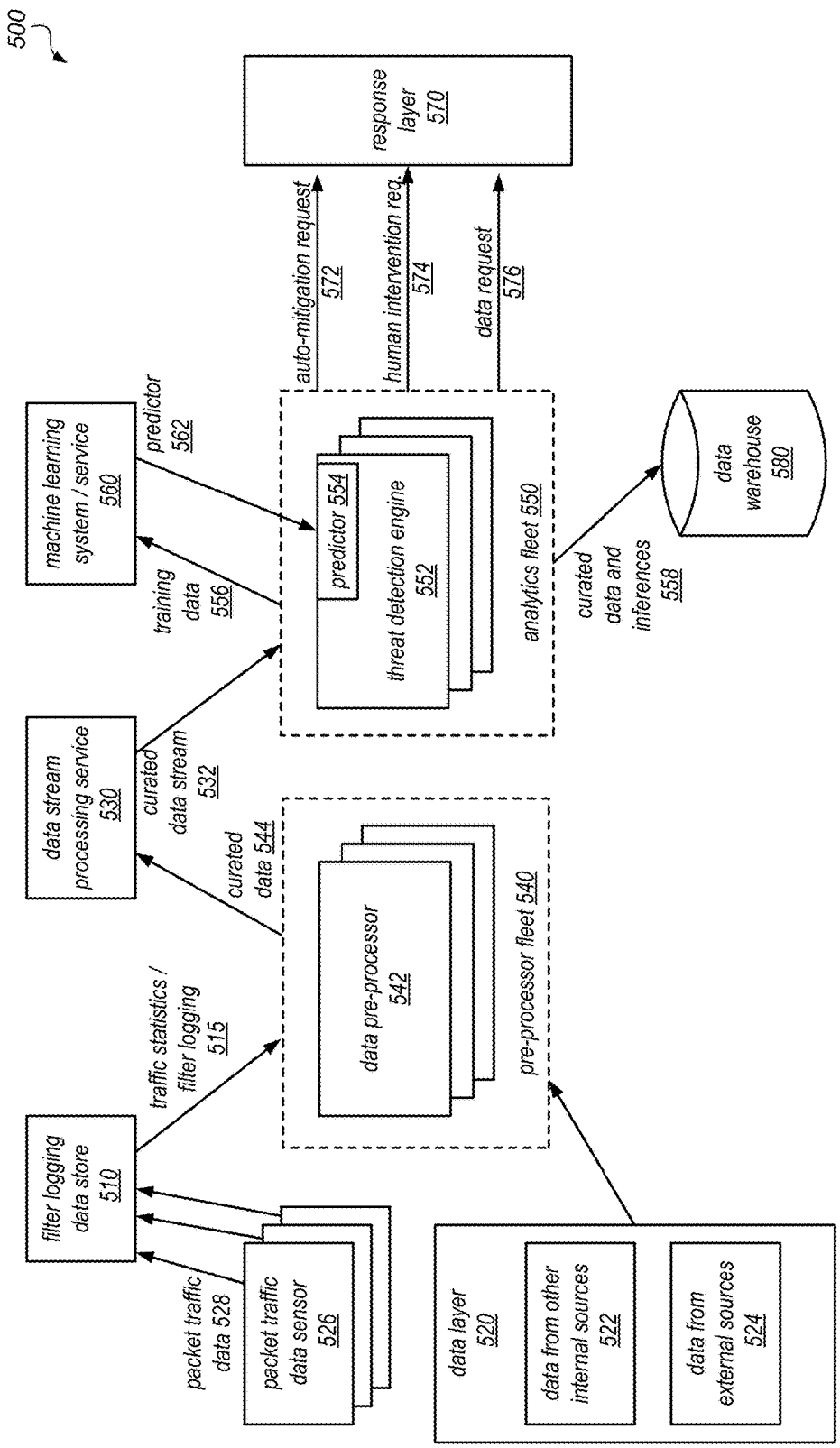
FIG. 5 is a block diagram illustrating a software architecture and corresponding data flow employed in security threat detection and mitigation, according to at least some embodiments.

One embodiment of a software architecture and corresponding data flow employed in security threat detection and mitigation is illustrated by the block diagram in FIG. 5. As illustrated in this example, security threat detection and mitigation platform 500 may include (or employ) a filter logging data store 510, a data stream processing service 530, a machine learning system or service 560, a pre-processor fleet 540 (which may include multiple data pre-processors 542), an analytics fleet 550 (which may include multiple threat detection engines 552, each of which may include a respective predictor 554), a data warehouse 580, and/or a response layer 570.

As illustrated in this example, security threat detection and mitigation platform 500 may also include multiple packet traffic data sensors 526 (e.g., sensors on respective droplets), which may collect and send packet traffic data 528 to filter logging data store 510. Filter logging data store 510 may then communicate its outputs to one or more of the data pre-processors 542 in pre-processor fleet 540 as traffic statistics and filter logging data 515. The data pre-processors 542 may, in turn, filter, organize, and/or curating the data and communicate the results to data stream processing service 530 as curated data 544. Data stream processing service may serve the curated data as a stream (shown as curated data stream 532) to one or more of the threat detection engines 552 in analytics fleet 550.

In this example, each of the threat detection engines 552 may be configured to detect security threats of a different type, based on a corresponding predictor 562 that is updated by machine learning system or service 560 based, at least in part, on inputs and inferences made by the threat detection engines (and any feedback about those inferences that are received), shown as training data 556. If one of the threat detection engines detects (or infers) that the behavior represented by the curated data stream is malicious behavior, it may initiate a response in an attempt to mitigate the threat. For example, a threat detection engine 552 may (if the detected threat is a type that is subject to an automatic mitigation response) send an auto-mitigation request 572 to response layer 570.

If the detected threat is a type that requires human intervention in order to mitigate the threat, the threat detection engine 552 may send a request to that effect (shown as human intervention request 574) to response layer 570, which may relay the request to a customer (on whose behalf the resource instance corresponding to the malicious behavior is hosted by the service provider), an administrator within the service provider organization, or a team responsible for security operations within the service provider organization. In some cases, more information may be required before a threat detection engine 552 can classify a behavior as malicious or acceptable. In such cases, the threat detection engine 552 may send a data request 576 to response layer 570, which may relay the request to a customer, an administrator, or a security operations team. In addition, a threat detection engine 522 may, after evaluating a curated data stream 532 and (in some cases) detecting a security threat, store curated data and any inferences made by the corresponding predictor 554 to data warehouse 580 (e.g., for further analysis and/or to provide additional training data for the predictor 554).

Figure 6:
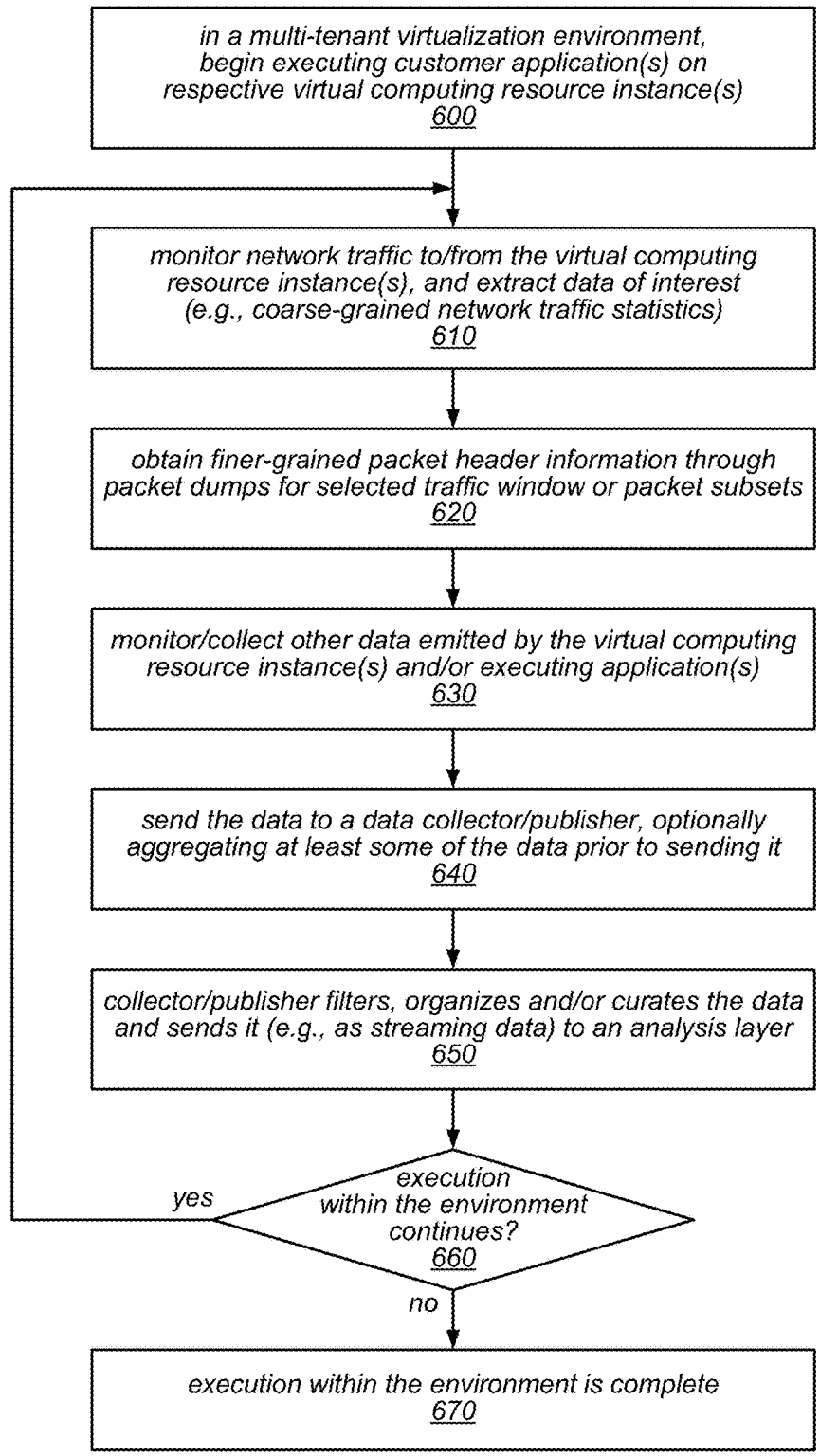
FIG. 6 is a flow diagram illustrating one embodiment of a method for collecting data for classifying the behavior of computing resource instances on a security threat detection and mitigation platform.
Figure 7:
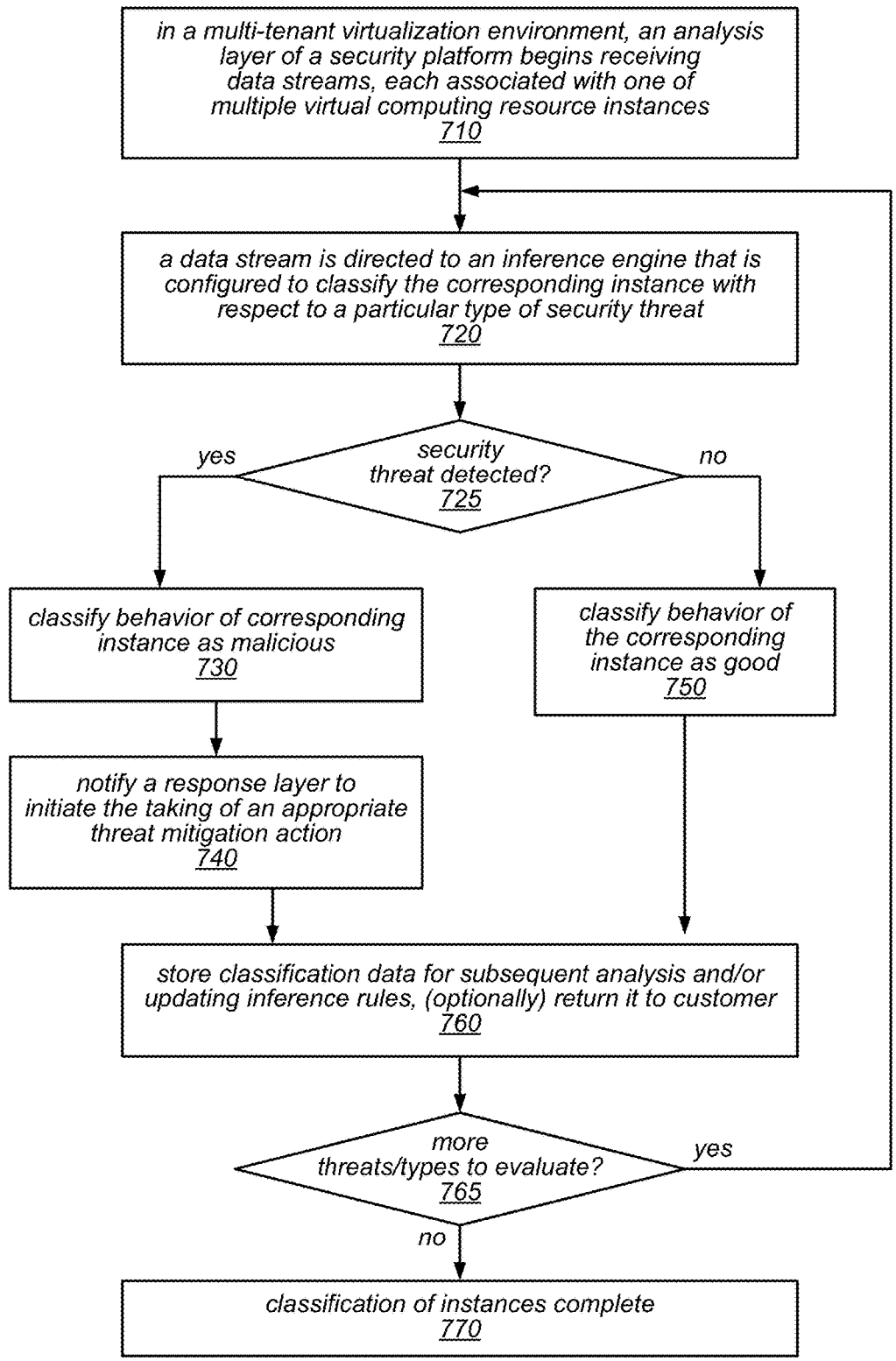
FIG. 7 is a flow diagram illustrating one embodiment of a method for analyzing data in order to classify the behavior of computing resource instances on a security threat detection and mitigation platform.
Figure 8:
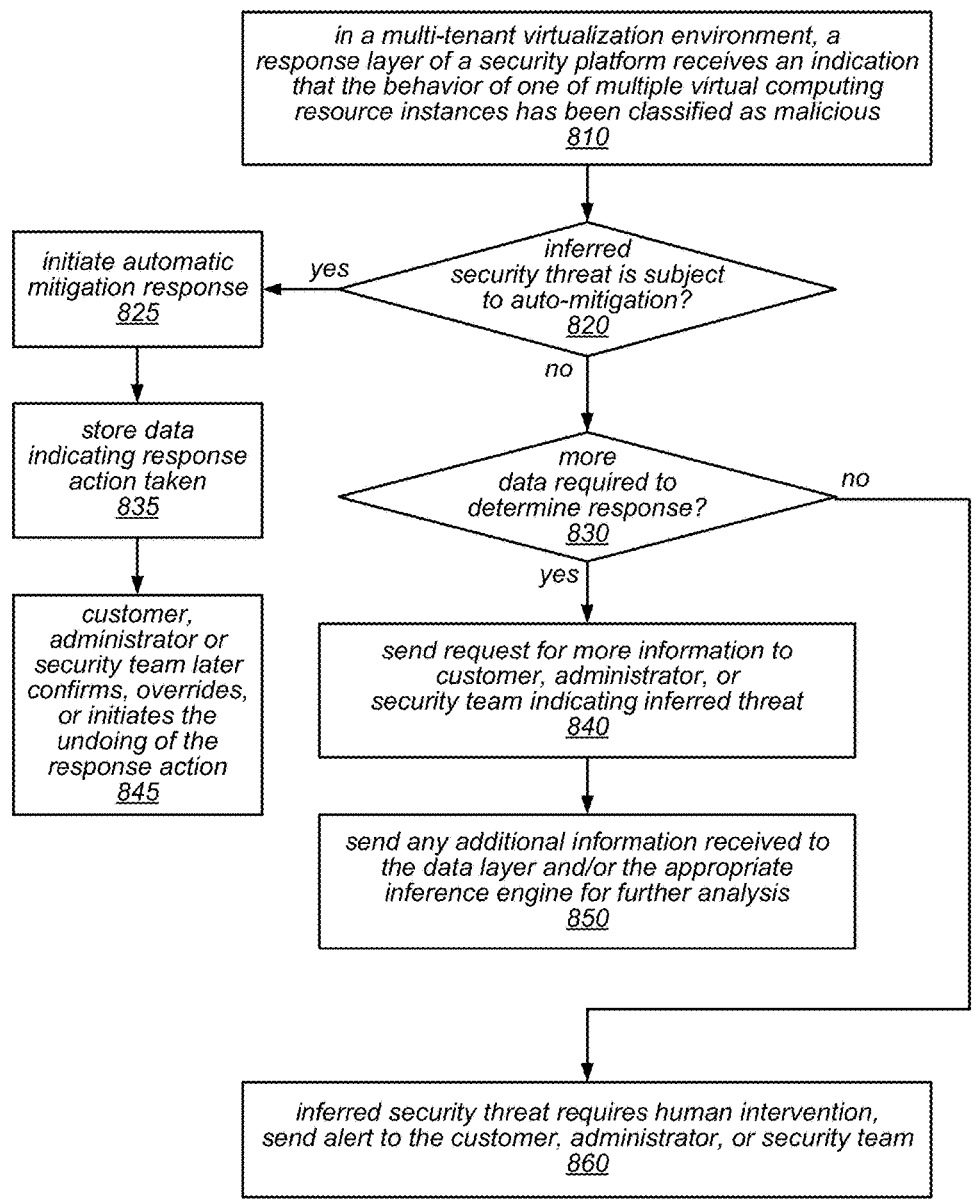
FIG. 8 is a flow diagram illustrating one embodiment of a method for responding to the classification of the behavior of a computing resource instance as malicious on a security threat detection and mitigation platform.

The operations of each of the layers of the security threat detection and mitigation platforms described herein may be further illustrated by the flow diagrams in FIGS. 6-8, according to at least some embodiments. For example, one embodiment of a method for collecting data for classifying the behavior of computing resource instances on a security threat detection and mitigation platform is illustrated by the flow diagram in FIG. 6. As illustrated at 600, in this example, the method may include, in a multi-tenant virtualization environment (e.g., a virtualization environment that employs, includes, or is built on a security threat detection and mitigation platform such as those described herein), beginning execution of one or more customer applications on respective virtual computing resource instances. The method may include monitoring network traffic to and/or from the virtual computing resource instance(s), and extracting data of interest (e.g., coarse-grained network traffic statistics) from the network traffic, as in 610. The method may also include obtaining finer-grained packet header information through packet dumps for one or more selected traffic windows or selected packet subsets, as in 620.

As illustrated in this example, the method may include monitoring and/or collecting other data (e.g., data of interest in detecting security threats) that is emitted by the virtual computing resource instance(s) and/or executing application(s), as in 630. The method may include sending the data to a data collector/publisher, and (optionally) aggregating at least some of the data prior to sending it, as in 640. The method may include the collector/publisher filtering, organizing and/or curating the data and sending it (e.g., as streaming data) to an analysis layer (e.g., one that includes multiple inference engines, at least some of which rely on machine models, or predictors, that are generated and updated based on machine learning), as in 650.

In this example, the operations shown in 610-650 may be repeated, as appropriate, while execution within the environment continues (i.e., until execution within the environment, and any corresponding network traffic, ceases). This is illustrated in FIG. 6 by the feedback from the positive exit of 660 to 610 and by the path from the negative exit of 660 to 670.

In some embodiments, the classifications determined (or inferred) by the data analysis layer of the security threat detection and mitigation platforms described herein may be performed using different approaches (some of which are more complex than others). In other words, the data analysis layer may include some data analysis components that are relatively simple (e.g., inferences engines that include only heuristic-based checks) and others that are more complicated (e.g., inference engines that employ machine learning type analysis modules). For example, some kinds of analysis require no state (e.g., if an instance sends even a single packet to port 0 at a particular destination, this is illegal and the analysis does not need to examine any other information to determine that this is illegal, and potentially malicious, behavior). In this case, one of the inference engines may simply classify the behavior as malicious and take appropriate action. For other analyses, the system may need to maintain state (e.g., sending traffic to three different ports and trying to establish connections with the three ports may be a benign behavior, but if an instance attempts to establish connections with 1000 ports at a destination, it make be likely that the instance is performing a malicious port scanning attack). However, determining that the instance attempts to establish 1000 connections may requires the system to maintain state (e.g., so that the corresponding inference engine can observe the cumulative actions that lead to a classification of malicious behavior). Note, however, that because the amount of state required to make some classification decisions with high confidence may be very large, the state typically cannot be maintained indefinitely. In some embodiments, state may be maintained for a set of behaviors that are observed (in association with any instance) within a sliding window (e.g., within a fifteen minute sliding window).

In some embodiments, in order to support more complex data analytics, the security platforms described herein may include a separate "data science" pipeline that runs in a separate cluster on the service provider network than the clusters on which customer instances and/or nodes of the security platform itself are hosted. In such embodiments, events may be sent to that data science pipeline, which performs an analysis to generate a classification for the event. In some embodiments, such an approach may involve relatively heavyweight clustering in which, given an event, a process of the data science pipeline may walk through a grid of event clusters to determine whether the given event belongs in one cluster or another. In some embodiments, the security platform may employ relatively lightweight machine learning techniques, and may rely on a separate machine learning service to generate (and subsequently update, if necessary) a predictor that will run inside the security platform (e.g., within a particular inference engine). In some embodiments, there may a pipeline of analytics engines with increasing sophistication implemented within the security platform, and data may be pumped through one or more of these analytics engines to apply an increasing level of complexity to classify behaviors.

As illustrated in FIG. 4 and described above, some example inference engines that may be supported in the data analysis layer of a security threat detection and mitigation platform may include, but are not limited to, inference engines configured to detect a slowloris attack, a DoS attack using a flood of SYN requests, a DOC attack using a flood of packets containing UDP datagrams, a botnet command and control system or another type of potentially malicious botnet, malicious scanning of ports on a host, malicious scanning of a port or ports across hosts, remote desktop or secure shell intrusion and/or a low denial of service (LDoS) attack. As previously noted, the data analysis layer may be extensible, such that an administrator or customer may define and install in the security platform additional inference engines having a wide range of complexities and input data requirements (e.g., heuristics-based inference engines and/or machine learning predictors) to detect additional types of security threats, in various embodiments.

One embodiment of a method for analyzing data in order to classify the behavior of computing resource instances on a security threat detection and mitigation platform is illustrated by the flow diagram in FIG. 7. As illustrated at 710, in this example, the method may include, in a multi-tenant virtualization environment (e.g., a virtualization environment that employs, includes, or is built on a security threat detection and mitigation platform such as those described herein), an analysis layer of a security platform beginning to receive data streams, each associated with one of multiple virtual computing resource instances. The method may include directing a data stream to an inference engine that is configured to classify the corresponding virtual computing resource instance with respect to a particular type of security threat, as in 720.

While no security threats are detected by the inference engine (shown as the negative exit from 725), the method may include classifying the behavior of the corresponding instance as good (e.g., as "normal" or "acceptable"), as in 750. If and when a security threat is detected, shown as the positive exit from 725, the method may include classifying the behavior of the corresponding instance as malicious (as in 730), and sending a notification to a response layer to initiate the taking of an appropriate security threat mitigation action (as in 740).

As illustrated in this example, the method may also include (e.g., periodically and/or in response to detecting a security threat), storing classification data (which may include the data upon which the classification was dependent) for subsequent analysis and/or to be used to update inference rules, and (optionally) returning the classification data to the customer (e.g., a customer on whose behalf the instance is hosted in the multi-tenant virtualization environment), as in 760.

As illustrated in this example, the operations shown as 720-760 may be repeated, as appropriate, while there are more potential threats and/or threat types to evaluate. This is illustrated in FIG. 7 by the feedback from the positive exit of 765 to 720. For example, there may be more security threat types for which a classification is dependent on the same or different (concurrently or subsequently received) data streams from one or more virtual computing resource instances and for which there are inference engines configured to detect and mitigate those types of security threats. Once (if ever) there are no additional potential threats to be evaluated, shown as the negative exit from 765, the classification of virtual computing resource instances may be complete, as in 770.

As described herein, once an event representing malicious behavior is detected by the data analysis stage of a security platforms described herein, there may be a number of different possible responses, including generating a ticket to initiate a manual response/action, requesting additional information, and/or taking an automated response action. In some embodiments, with each of these types of responses, human beings may be made aware of what was detected and what was done in response (even when the detected security threat is subject to "auto-mitigation"). For example, if a behavior is classified as malicious with very high confidence and if that behavior, left unchecked, could cause serious damage or disruptions in the system, the security platform (at the request of the corresponding inference engine) may initiate an automatic response action to block all search traffic being sent from the corresponding instance(s), or (e.g., if an instance is doing nothing but malicious activities) to shut the instance down (e.g., to disconnect it from the network). However, even in these cases, the event (and corresponding action taken) may be provided to a security platform console so that the event and response becomes visible. In response to the event and response being made visible, a human being (e.g., a customer or administrator) may validate or override (and potentially undo) the response action that was taken automatically. For example, if a customer or administrator determines that the behavior was not malicious or that, for some other reason, the automatic response action was unwarranted, they make take steps to return the affected instances to their previous states (e.g., reconnecting them to the network, disabling throttling, or unblocking traffic to or from those instances). In some embodiments, the response layer may be considered to include multiple phases, e.g., a decision-making phase, a mitigation phase, and a verification phase, various operations of which are described herein.

One embodiment of a method for responding to the classification of the behavior of a computing resource instance as malicious on a security threat detection and mitigation platform is illustrated by the flow diagram in FIG. 8. As illustrated at 810, in this example, the method may include, in a multi-tenant virtualization environment (e.g., a virtualization environment that employs, includes, or is built on a security threat detection and mitigation platform such as those described herein), a response layer of the security platform receiving an indication that the behavior of one of multiple virtual computing resource instances has been classified as malicious. If the inferred security threat is subject to an automatic mitigation response (shown as the positive exit from 820), the method may include initiating the automatic mitigation response (as in 825), and storing data indicating the response action that was taken (as in 835). The method may also include a customer (e.g., a customer on whose behalf the resource instance corresponding to the malicious behavior is hosted by the service provider), an administrator within the service provider organization, or a team responsible for security operations within the service provider organization subsequently confirming, overriding, or initiating the undoing of the response action (e.g., in an oversight role), as in 845.

If, however, the inferred security threat is not subject to an automatic mitigation response (shown as the negative exit from 820), and if more data is required to determine a response to the classification of the behavior as malicious (shown as the positive exit from 830), the method may include sending a request for more information to the customer, administrator, or security team indicating inferred threat, as in 840. In this example, the method may include sending any additional information that is received to the data layer and/or to the appropriate inference engine for further analysis, as in 850.

If, however, no additional data is required (shown as the negative exit from 830), this may imply that human intervention is required in order to mitigate the detected security threat. Therefore, the method may include sending an alert to that effect to the customer, administrator, or security operations team of the service provider, as in 860.

The operations of the security threat detection and mitigation platforms described herein may be further illustrated by way of a specific threat detection and mitigation example. In this example, the security platform includes an inference engine that is configured to detect egress DoS attacks (e.g., DoS attacks that are launched by computing resource instances hosted by the service provider against external sites). The inference engine may be configured to identify certain kinds of DoS attacks by analyzing traffic statistics (e.g., the ratio of inbound to outbound bytes and/or packets). The egress DoS detection module of the security platform may apply machine learning techniques on data gathered by the data collection layer to identify traffic emitted by a given instance as representing an egress DoS attack or not. If the traffic is identified as an egress DoS attack, corrective action may be taken automatically. For example, the malicious traffic from the instance may be throttled (e.g., using on-droplet firewall rules) and the customer on whose behalf the affected instance is hosted by the service provider may be notified.

Figure 9:
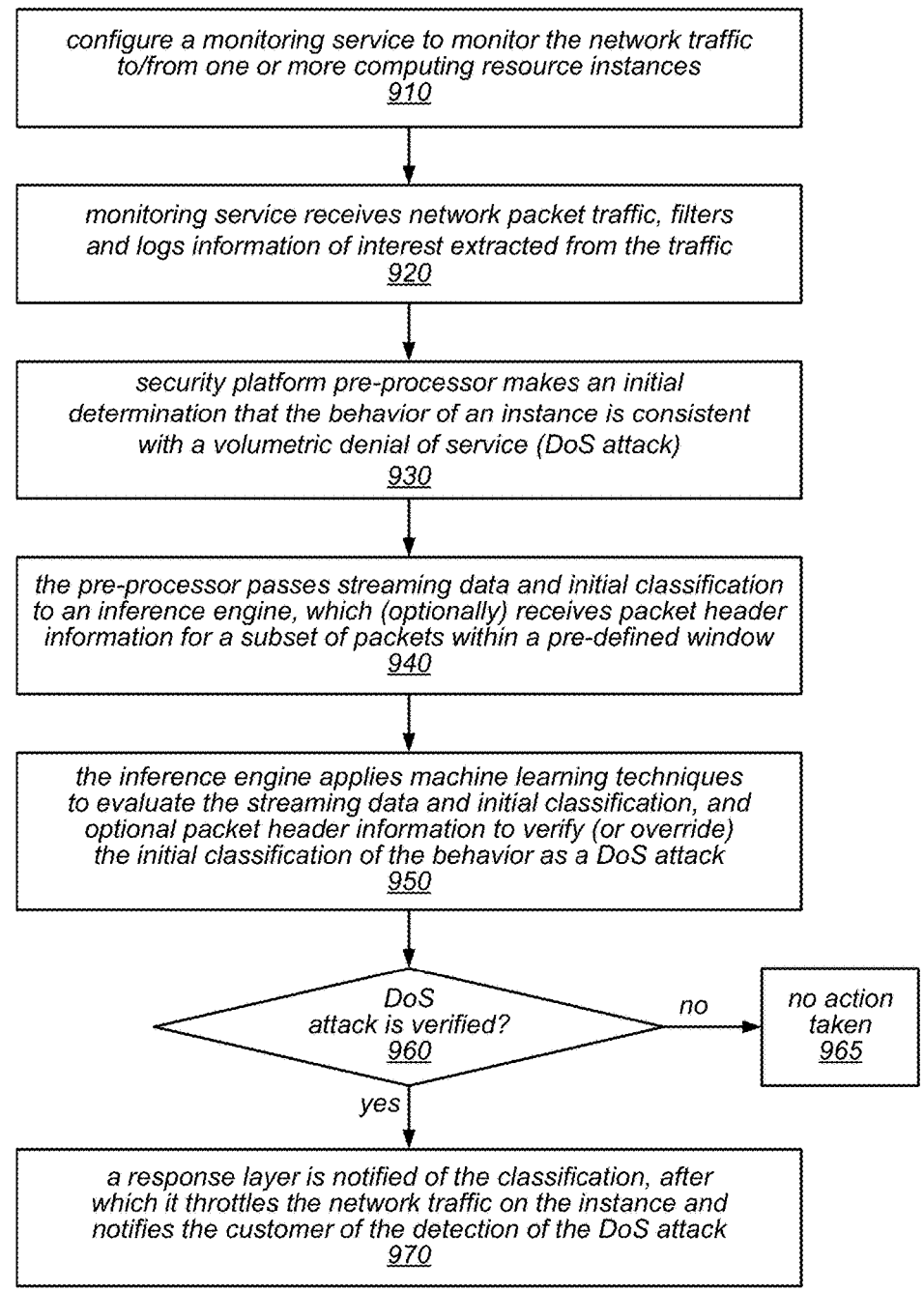
FIG. 9 is a flow diagram illustrating one embodiment of a method for detecting an egress denial of service (DoS) attack on a security threat detection and mitigation platform.

One embodiment of a method for detecting an egress denial of service (DoS) attack on a security threat detection and mitigation platform is illustrated by the flow diagram in FIG. 9. As illustrated at 910, in this example, the method may include configuring a monitoring service to monitor the network traffic to and/or from one or more computing resource instances. For example, in some embodiments, network traffic may be monitored by a monitoring service that is a component of a security threat detection and mitigation platform, such as those described herein, or that is a component of a multi-tenant environment that provides resource virtualization services to customers. The method may include the monitoring service receiving network packet traffic, and filtering and logging information of interest that it extracts from the traffic, as in 920.

As illustrated in this example, the method may include a security platform pre-processor making an initial determination that the behavior of a computing resource instance is consistent with a volumetric denial of service (DoS attack), as in 930. The method may also include the pre-processor passing streaming data and the initial classification information to an inference engine, which (optionally) also receives packet header information for a subset of packets within a pre-defined window, as in 940. The method may include the inference engine applying machine learning techniques to evaluate the streaming data and initial classification, and any optional packet header information to verify (or override) the initial classification of the behavior as a DoS attack, as in 950.

If the DoS attack is verified, shown as the positive exit from 960, the method may include notifying a response layer of the classification, after which the response layer may throttle the network traffic on the corresponding computing resource instance and may notify the customer on whose behalf the instance is hosted of the detection of the DoS attack, as in 970. However, if the DoS attack is not verified (or if it is determined that the network traffic does not represent a DoS attack but represents acceptable behavior), shown as the negative exit from 960, no mitigation actions may be taken in response to the initial classification, as in 965.

As previously noted, the functionality of the security platforms described herein may be extended by introducing additional data collection, data analysis, and/or response components such that additional types of security threats can be detected and/or to provide additional types of collected, filtered, aggregated, or otherwise organized data to improve the classification results of one or more existing inference engines using machine learning techniques. In other words, the security platforms described herein may allow a variety of different modules to be plugged into the framework in order to attempt to detect different types of malicious behaviors based on different input streams that are fed to the analysis layer of the security platform from different sensors and agents in the data collection layer, and/or to allow different actions to be taken in response to determining that the behavior of an instance has been classified as malicious behavior. The pluggable components may include pluggable sensors, collectors, publishers, aggregation components, analysis engines, machine models, and/or response modules, in various embodiments.

In various embodiments, internal customers (e.g., other components or services implemented in the same service provider network or environment) and/or external customers (e.g., customers on whose behalf virtual computing resource instances are hosted on physical computing devices in a service provider network or environment that implements the security threat detection and mitigation techniques described herein) may be able (e.g., through a security platform API or using other means) define and introduce pluggable components into the security platform. For example, in some cases, customers of the security service may have more information about the context of various detected events and behaviors than are generally available to the security platform. For example, they may have access to the payloads of the packets that are sent to and from their new processes or applications (or the instances hosted on their behalf on which these processes or applications run). In some embodiments, the systems described herein may allow a customer to provide such information to the security platform (e.g. to emit at least some of the contents of the packets in a manner that allows their discovery and/or retrieval by components within the security platform. In some embodiments, the platform may provide a mechanism through which a customer may feed their data directly to an inference engine and/or create an inference engine that runs their data analysis or threat detection algorithms.

In some embodiments, in order to introduce a new inference engine into the security platform (e.g., one that employs machine learning techniques), the customer may provide a detection algorithm and/or a set of training data to be used to train the inference engine to recognize events of interests (e.g., those representing malicious behavior). In some embodiments, the customer may also be able to specify (or introduce) a response module to be called (or otherwise invoked) when and if events of interest are detected. Introducing a new data collection module into the security platform may include creating an agent to extract data of interest form network traffic, packet headers, or other data emitted by a computing resource instance (or application/process executing thereon). For example, an agent may be introduced that collects data representing "IP address ownership age" (which represents how long a given IP address been owned by the current owner), and this data may be used in conjunction with IP address reputation data to detect certain types of security threats, rather than relying only on IP address reputation (which may tend to be rather volatile in virtualized computing environments).

Figure 10:
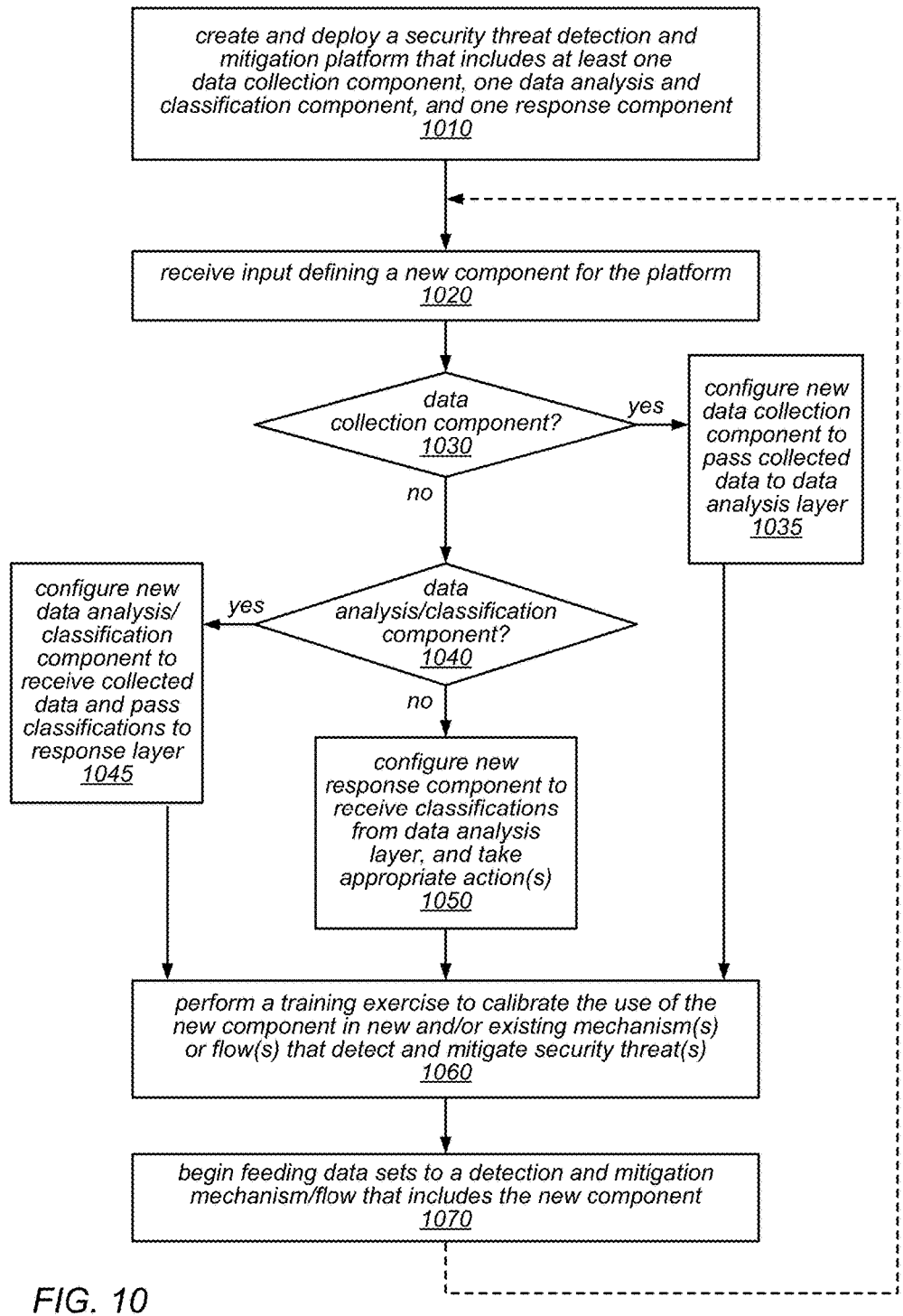
FIG. 10 is a flow diagram illustrating one embodiment of a method for providing an extensible security threat detection and mitigation platform.

One embodiment of a method for providing an extensible security threat detection and mitigation platform is illustrated by the flow diagram in FIG. 10. As illustrated at 1010, in this example, the method may include a service provider creating and deploying a security threat detection and mitigation platform that includes at least one data collection component, one data analysis and classification component, and one response component. For example, the security platform may include a data analysis component (e.g., single inference engine) that is configured to classify the behavior of a computing resource instance with respect to a particular security threat (and that may or may not employ machine learning techniques). The method may include the service provider receiving input defining a new component to be added to the security threat detection and mitigation platform, as in 1020.

If the new component is a data collection component, shown as the positive exit from 1030, the method may include configuring the new data collection component to pass collected data (e.g., data of a previously uncollected type or from a previously untapped data source) to the data analysis layer of the security component, as in 1035. If the new component is a data analysis and classification component (e.g., a new inference engine that is configured to detect security threats of a previously undetected type or to detect security threats using an approach that was previously unsupported on the security platform), shown as the positive exit of 1040, the method may include configuring the new data analysis/classification component to receive collected data and pass the classifications it infers to the response layer of the security platform, as in 1045.

If the new component is neither a new data collection component nor a new data analysis and classification component (e.g., a new inference engine), shown as the negative exits from 1030 and 1040, the new component may be a new response component. In this case, the method may include configuring the new response component to receive classifications from data analysis layer, and to take one or more appropriate actions (e.g., response actions that were previously unsupported in the security platform for one or more security threat types), as in 1050.

As illustrated in this example, regardless of the type of new component that is defined for the security threat detection and mitigation platform, the method may (in at least some embodiments) include performing a training exercise to calibrate the use of the new component within new and/or existing mechanism(s) or flow(s) that detect and mitigate security threat(s), as in 1060. For example, if the new component is a new inference engine (e.g., one that detects a new type of security threat or that detects security threats using different input data), the method may include feeding training data to the new component to train it to detect security threats of the targeted type. Once the new component has been integrated into one or more mechanisms or flows within the security platform, the method may include beginning to feed previously unknown data sets to a detection and mitigation mechanism/flow that includes the new component, as in 1070.

As illustrated in this example, in some embodiments, the operations shown as 1020-1070 may be repeated when and if the security platform is further extended by the addition of new data collection, data analysis, and/or response components. This is illustrated in FIG. 10 by the feedback from 1070 to 1020.

In some embodiments, the security threat detection and mitigation platforms (and modules thereof) may produce security information and take actions that may impact customers and may be made visible to them. Additionally, customers may be required (and/or optionally allowed) to take actions that will be useful to the service provider system as a whole (e.g., to mitigate malicious or disruptive behavior in the system). In various embodiments, the security platforms may communicate with customers via a service provider console, various security platform APIs and/or other customer communication mechanisms (such as email or text messaging), as appropriate.

Figure 11:
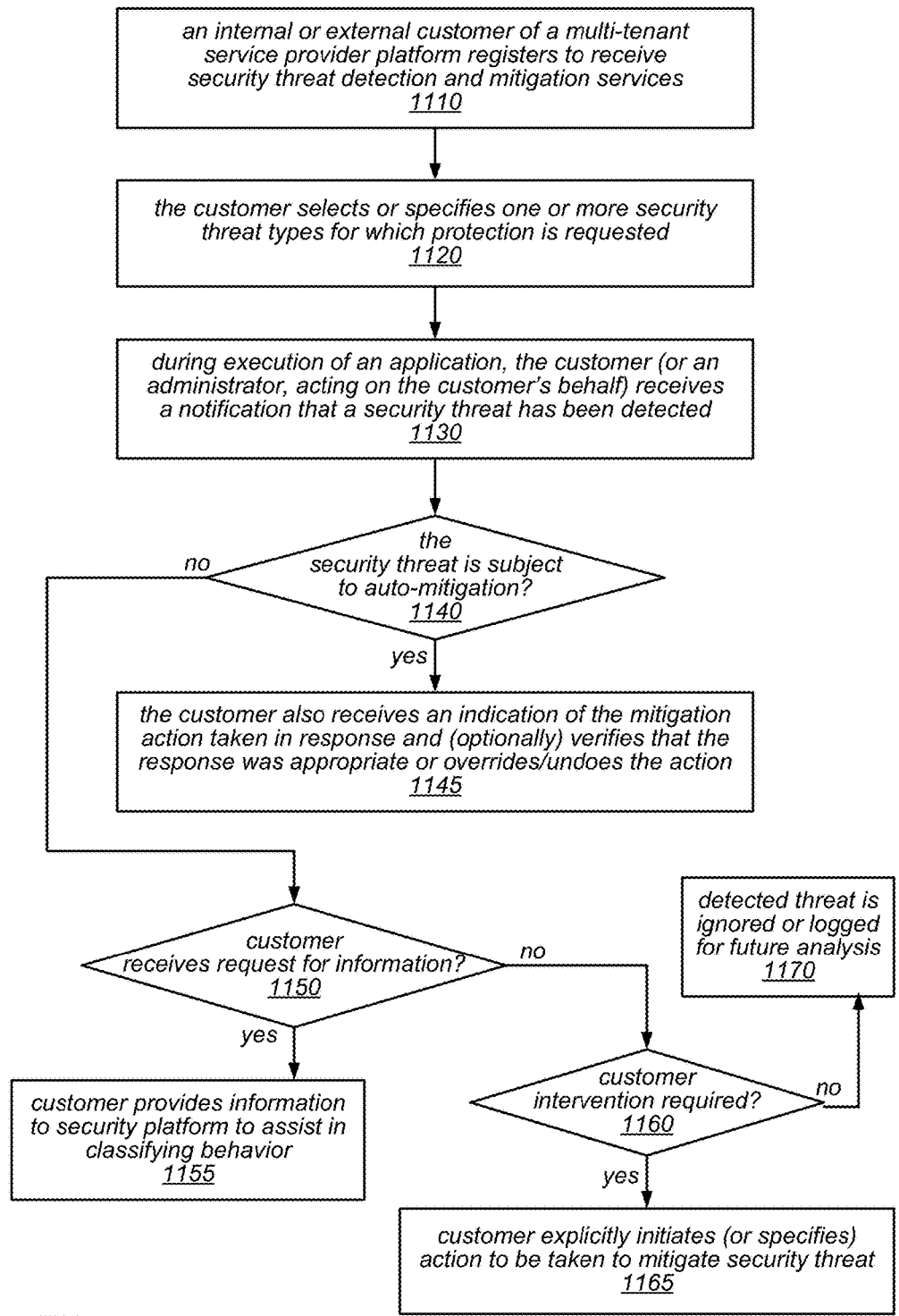
FIG. 11 is a flow diagram illustrating one embodiment of a method for an internal or external customer to make use of a security treat detection and mitigation platform.

One embodiment of a method for an internal or external customer to make use of a security treat detection and mitigation platform is illustrated by the flow diagram in FIG. 11. As illustrated at 1110, in this example, the method may include an internal or external customer of a multi-tenant service provider platform registering to receive security threat detection and mitigation services. The method may also include the customer selecting or specifying one or more security threat types for which protection is requested, as in 1120. For example, in some embodiments, the customer may automatically receive default services (e.g., protection against a default set of security threats) once registered to receive security threat detection and mitigation services and/or the customer may request protection against one or more specifically identified, application-specific, or customer-specific security threat types.

As illustrated in this example, the method may include, during execution of an application, the customer (or an administrator, acting on the customer's behalf) receiving a notification that a security threat has been detected, as in 1130. If the security threat is subject to an automatic mitigation response, shown as the positive exit from 1140, the method may include the customer (or administrator) also receiving an indication of the mitigation action that is taken in response and (optionally) the customer (or administrator) verifying that the response was appropriate, overriding the classification and response, or undoing the action, as in 1145. If, on the other hand, the customer (or administrator) receives a request for information about an apparent security threat, shown as the positive exit from 1150, the method may include the customer providing information to the security platform to assist in classifying the behavior, as in 1155.

If, however, human intervention (e.g., by the customer or administrator) is required in response to the security threat, shown as the positive exit from 1160, the method may include the customer (or administrator) explicitly initiating (or specifying) the particular action to be taken to mitigate the security threat, as in 1165. In this example, if none of the conditions shown in 1140, 1150, or 1160 are met for the detected security threat, shown as the negative exits from 1140, 1150, and 1160, the method may include ignoring the detected threat or logging an indication of the detected security threat for future analysis, as in 1170.

Note that, in at least some embodiments, any or all of the operations shown as 1130-1170 may be repeated, as appropriate, if and when any other security threats are detected (not shown).

In various embodiments, the security threat detection and mitigation platforms described herein may apply machine learning techniques and within a common framework across broad spaces of infrastructure (including within service provider environments that provide virtualization services and other services to internal and external customers), with integration points across multiple services. In some such embodiments, a variety of different services may consume some of the same streams of data, and may build inference engines that create response triggers based on patterns detected in those data streams. In some embodiments, by implementing these security platforms in a cloud-based environment and/or a centralized location, multiple technologies, teams of people, and/or services may consume the same streams and respond differently to them based on detecting predefined types of behaviors.

As described herein, the security platforms may operate at an unprecedented scale in multi-tenant systems that experience a very high rate of change of IP address ownership. In these systems, the need to correctly classify the behavior of computing resource instances, processes, and applications is higher than ever and these systems cannot rely solely on older internet security measures to protect themselves (and their customers) from malicious behavior, such a security threats and attacks. The techniques described herein may reduce the latency between the time that an event takes place and the ability of the security platform to correctly classify it and contain it (if the event represents malicious behavior). In these systems, the ability to respond to at least security threats automatically may allow them to be mitigated before the damage is widespread. In addition, by employing machine learning techniques in the inference engines of the security platforms, the quality of the classification results may be improved over those of existing security systems and may be continuously updated if and when additional training sets and live data indicate that modifying the rules for recognizing malicious behavior may lead to more accurate results.

Note that while various mechanisms and techniques for applying machine learning to data analysis in systems in which the components communicate with each other over a network and/or emit other types of data usable in classifying the behavior of the components have been described in the context of security threat detection and mitigation, these techniques may be applicable to classification of instances, processes, applications, and/or events in other contexts (e.g., in other contexts in which there are multiple data sources that are generated by processes or applications running in different instances within a multi-tenant virtual cloud computing environment). In some embodiments, data streams containing information other than security-related information (including application-specific or customer-specific statistics) may be processed by multiple inference engines that apply machine learning techniques to classify the instances in order to generate other types of responses (some of which may be taken automatically in response to detecting particular patterns in the data streams). In one example, the techniques described herein may be applied to in a platform having a similar framework and infrastructure to perform data analysis based on collected heat map data or other information in order to take particular actions related to server placement (e.g., to determine whether and when to migrate instances from an overloaded droplet to another, less heavily loaded droplet).

Example Provider Network Environments

This section describes example provider network environments in which embodiments of the methods and apparatus described herein (e.g., those employed in security threat detection and mitigation) may be implemented. However, these example provider network environments are not intended to be limiting.

Figure 12:
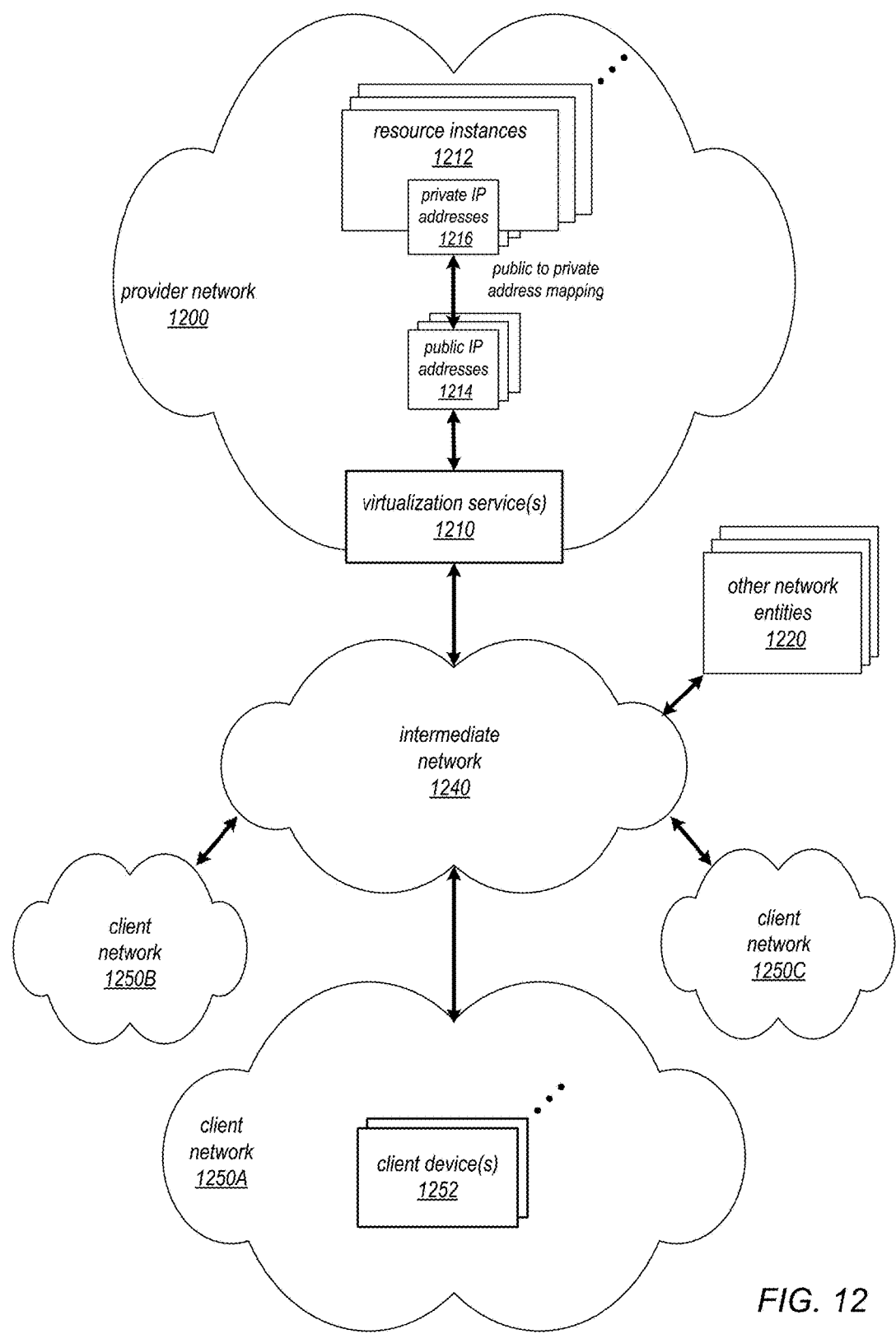
FIG. 12 illustrates an example provider network environment, according to at least some embodiments.

FIG. 12 illustrates an example provider network environment, according to at least some embodiments. A provider network 1200 may provide resource virtualization to clients via one or more virtualization services 1210 that allow clients to purchase, rent, or otherwise obtain instances 1212 of virtualized resources, including but not limited to computation and storage resources, implemented on devices within the provider network or networks in one or more data centers. Private IP addresses 1216 may be associated with the resource instances 1212; the private IP addresses are the internal network addresses of the resource instances 1212 on the provider network 1200. In some embodiments, the provider network 1200 may also provide public IP addresses 1214 and/or public IP address ranges (e.g., Internet Protocol version 4 (IPv4) or Internet Protocol version 6 (IPv6) addresses) that clients may obtain from the provider 1200.

Conventionally, the provider network 1200, via the virtualization services 1210, may allow a client of the service provider (e.g., a client that operates client network 1250A) to dynamically associate at least some public IP addresses 1214 assigned or allocated to the client with particular resource instances 1212 assigned to the client. The provider network 1200 may also allow the client to remap a public IP address 1214, previously mapped to one virtualized computing resource instance 1212 allocated to the client, to another virtualized computing resource instance 1212 that is also allocated to the client. Using the virtualized computing resource instances 1212 and public IP addresses 1214 provided by the service provider, a client of the service provider such as the operator of client network 1250A may, for example, implement client-specific applications and present the client's applications on an intermediate network 1240, such as the Internet. Other network entities 1220 on the intermediate network 1240 may then generate traffic to a destination public IP address 1214 published by the client network 1250A; the traffic is routed to the service provider data center, and at the data center is routed, via a network substrate, to the private IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Note that, although no monitoring components or security threat detection and mitigation service components are shown in FIG. 12, such components may be implemented within the control plane of virtualization services 1210, in some embodiments. In other embodiments, such components may be implemented as part of a separate security threat detection and mitigation service on provider network 1200, and the virtualization services 1210 may be clients (e.g., internal customers) of such a service.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients (e.g., client applications through which end users, service subscribers or third party services that are customers of the service interact with the service) of the provider network 1200; a client may then assign their allocated public IP addresses to particular resource instances allocated to the client. These public IP addresses may be referred to as client public IP addresses, or simply client IP addresses. Instead of being assigned by the provider network 1200 to resource instances as in the case of standard IP addresses, client IP addresses may be assigned to resource instances by the clients, for example via an API provided by the service provider. Unlike standard IP addresses, client IP Addresses are allocated to client accounts (e.g., customer accounts) and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 13:
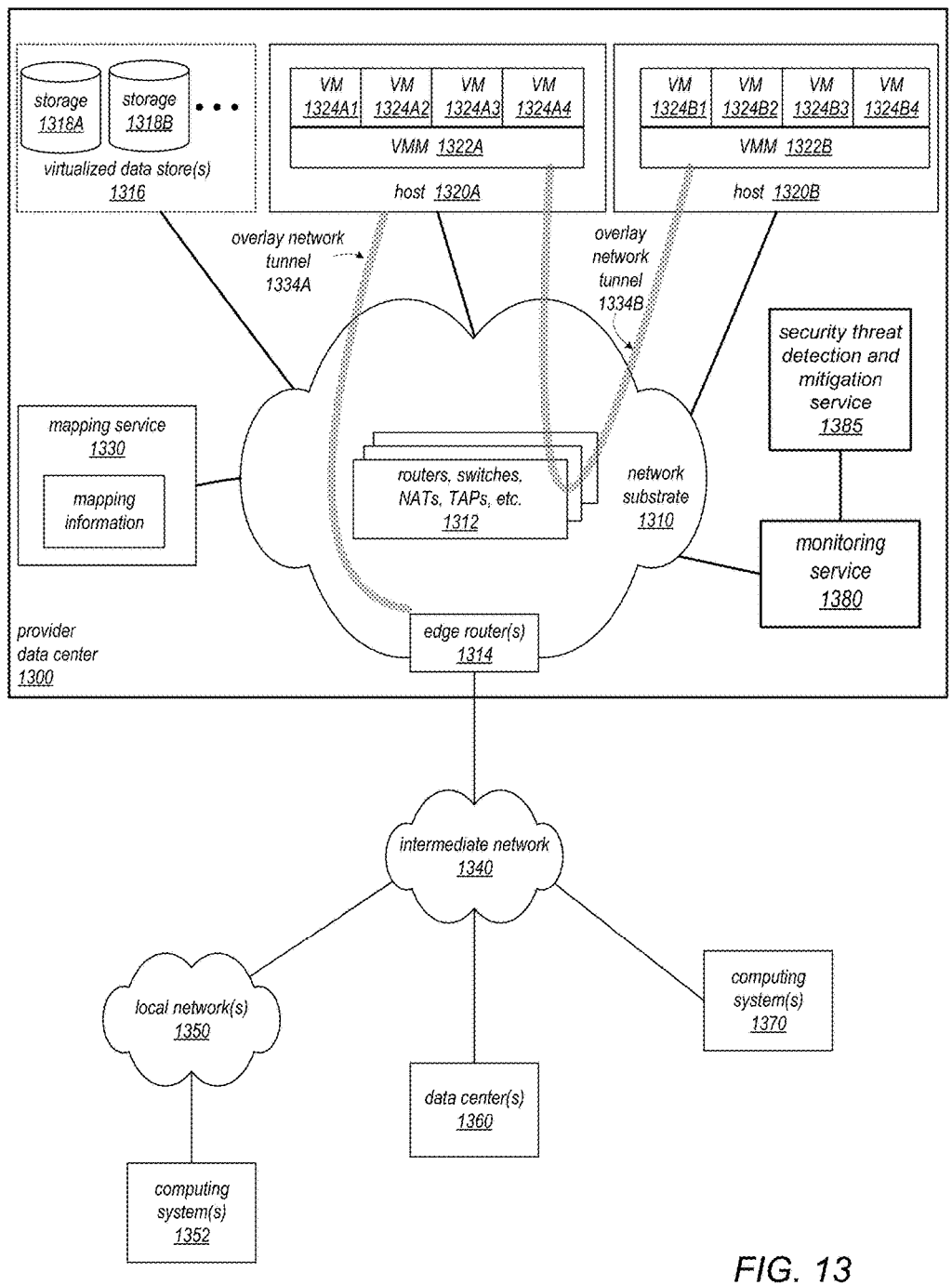
FIG. 13 illustrates an example data center that implements an overlay network on a network substrate using IP tunneling technology, according to at least some embodiments.

FIG. 13 illustrates an example data center that implements an overlay network on a network substrate using IP tunneling technology, according to at least some embodiments. A provider data center 1300 may include a network substrate that includes networking devices 1312 such as routers, switches, network address translators (NATs), and so on. At least some embodiments may employ an Internet Protocol (IP) tunneling technology to provide an overlay network via which encapsulated packets may be passed through network substrate 1310 using tunnels. The IP tunneling technology may provide a mapping and encapsulating system for creating an overlay network on a network (e.g., a local network in data center 1300 of FIG. 13) and may provide a separate namespace for the overlay layer (the public IP addresses) and the network substrate 1310 layer (the private IP addresses). Packets in the overlay layer may be checked against a mapping directory (e.g., provided by mapping service 1330) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1330) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 13, an example overlay network tunnel 1334A from a virtual machine (VM) 1324A on host 1320A to a device on the intermediate network 1340 (through edge router 1314) and an example overlay network tunnel 1334B between a VM 1324B on host 1320B and a VM 1324C on host 1320C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses. In some embodiments, an IP tunneling technology such as that illustrated in FIG. 13 may be employed when executing an application on a virtual machine instance (or a cluster of such instances) that is a client (e.g., an internal customer) of security threat detection and mitigation service 1385, as described herein.

Referring to FIG. 13, at least some networks in which embodiments may be implemented may include hardware virtualization technology that enables multiple operating systems to run concurrently on a host computer (e.g., hosts 1320A and 1320B of FIG. 13), i.e. as virtual machines (VMs) 1324 on the hosts 1320. The VMs 1324 may, for example, be rented or leased to clients of a network provider. A hypervisor, or virtual machine monitor (VMM) 1322, on a host 1320 presents the VMs 1324 on the host with a virtual platform and monitors the execution of the VMs 1324. Each VM 1324 may be provided with one or more private IP addresses; the VMM 1322 on a host 1320 may be aware of the private IP addresses of the VMs 1324 on the host. A mapping service 1330 may be aware of all network IP prefixes and the IP addresses of routers or other devices serving IP addresses on the local network. This includes the IP addresses of the VMMs 1322 serving multiple VMs 1324. The mapping service 1330 may be centralized, for example on a server system, or alternatively may be distributed among two or more server systems or other devices on the network. A network may, for example, use the mapping service technology and IP tunneling technology to, for example, route data packets between VMs 1324 on different hosts 1320 within the data center 1300 network; note that an interior gateway protocol (IGP) may be used to exchange routing information within such a local network.

In addition, a network such as the provider data center 1300 network (which is sometimes referred to as an autonomous system (AS)) may use the mapping service technology, IP tunneling technology, and routing service technology to route packets from the VMs 1324 to Internet destinations, and from Internet sources to the VMs 1324. Note that an external gateway protocol (EGP) or border gateway protocol (BGP) is typically used for Internet routing between sources and destinations on the Internet. FIG. 13 shows an example provider data center 1300 implementing a network that provides resource virtualization technology and that provides full Internet access via edge router(s) 1314 that connect to Internet transit providers, according to at least some embodiments. The provider data center 1300 may, for example, provide clients the ability to implement virtual computing systems (VMs 1324) via a hardware virtualization service and the ability to implement virtualized data stores 1316 on storage resources 1318 via a storage virtualization service. Note that, in various embodiments, storage 1318 of virtualized data store 1316 may include object storage, block-based storage, and/or volume-based storage, as described herein.

The data center 1300 network may implement IP tunneling technology, mapping service technology, and a routing service technology to route traffic to and from virtualized resources, for example to route packets from the VMs 1324 on hosts 1320 in data center 1300 to Internet destinations, and from Internet sources to the VMs 1324. Internet sources and destinations may, for example, include computing systems 1370 connected to the intermediate network 1340 and computing systems 1352 connected to local networks 1350 that connect to the intermediate network 1340 (e.g., via edge router(s) 1314 that connect the network 1350 to Internet transit providers). The provider data center 1300 network may also route packets between resources in data center 1300, for example from a VM 1324 on a host 1320 in data center 1300 to other VMs 1324 on the same host or on other hosts 1320 in data center 1300.

A service provider that provides data center 1300 may also provide additional data center(s) 1360 that include hardware virtualization technology similar to data center 1300 and that may also be connected to intermediate network 1340. Packets may be forwarded from data center 1300 to other data centers 1360, for example from a VM 1324 on a host 1320 in data center 1300 to another VM on another host in another, similar data center 1360, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1318, as virtualized resources to clients of a network provider in a similar manner.

As illustrated in FIG. 13, in some embodiments, provider data center 1300 may include a monitoring service 1380 and/or a security threat detection and mitigation service 1385. For example, in some embodiments, monitoring service 1380 may be configured to gather and analyze network packet traffic between various components within provider data center 1300, to gather and analyze network packet traffic between components of provider data center 1300 and network endpoints outside of provider data center 1300, and/or to gather and analyze other security-related data of interest. Monitoring service 1380 may pass this information to security threat detection and mitigation service 1385 for further analysis and classification of the behaviors of various internal or external components, after which it may determine whether and when there is a need to take action to mitigate a detected security threat. In some embodiments, distributed computing services provided by provider data center 1300 may be clients of monitoring service 1380 and/or of security threat detection and mitigation service 1385. In some embodiments, security threat detection and mitigation service 1385 may be configured to perform any threat detection mitigation actions in response to security threats that are detected (or inferred) using the any of the techniques described herein (including those based on machine learning).

Figure 14:
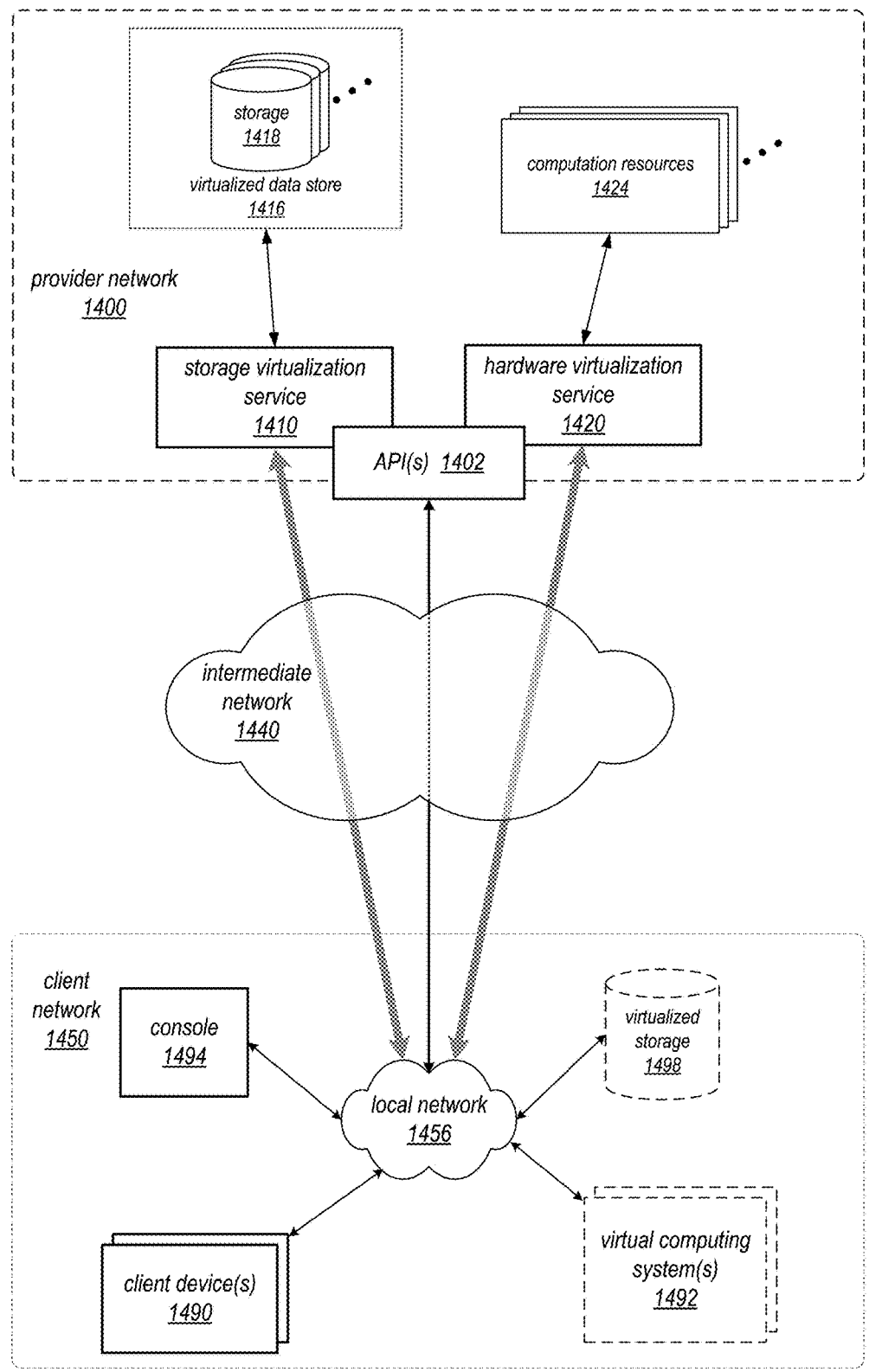
FIG. 14 is a block diagram of an example provider network that provides a storage virtualization service and a hardware virtualization service to clients, according to at least some embodiments.

FIG. 14 is a block diagram of an example provider network that provides a storage virtualization service and a hardware virtualization service to clients, according to at least some embodiments. Hardware virtualization service 1420 provides multiple computation resources 1424 (e.g., VMs) to clients. The computation resources 1424 may, for example, be rented or leased to clients of the provider network 1400 (e.g., to a client that implements client network 1450). Each computation resource 1424 may be provided with one or more private IP addresses. Provider network 1400 may be configured to route packets from the private IP addresses of the computation resources 1424 to public Internet destinations, and from public Internet sources to the computation resources 1424.

Provider network 1400 may provide a client network 1450, for example coupled to intermediate network 1440 via local network 1456, the ability to implement virtual computing systems 1492 via hardware virtualization service 1420 coupled to intermediate network 1440 and to provider network 1400. In some embodiments, hardware virtualization service 1420 may provide one or more APIs 1402, for example a web services interface, via which a client network 1450 may access functionality provided by the hardware virtualization service 1420, for example via a console 1494. In at least some embodiments, at the provider network 1400, each virtual computing system 1492 at client network 1450 may correspond to a computation resource 1424 that is leased, rented, or otherwise provided to client network 1450.

From an instance of a virtual computing system 1492 and/or another client device 1490 or console 1494, the client may access the functionality of storage virtualization service 1410, for example via one or more APIs 1402, to access data from and store data to a virtualized data store 1416 provided by the provider network 1400. In some embodiments, a virtualized data store gateway (not shown) may be provided at the client network 1450 that may locally cache at least some data, for example frequently accessed or critical data, and that may communicate with virtualized data store service 1410 via one or more communications channels to upload new or modified data from a local cache so that the primary store of data (virtualized data store 1416) is maintained. In at least some embodiments, a user, via a virtual computing system 1492 and/or on another client device 1490, may mount and access virtualized data store 1416 volumes, which appear to the user as local virtualized storage 1498. Note that, in various embodiments, storage 1418 of virtualized data store 1416 may include object storage, block-based storage, and/or volume-based storage, as described herein.

While not shown in FIG. 14, the virtualization service(s) may also be accessed from resource instances within the provider network 1400 via API(s) 1402. For example, a client, appliance service provider, or other entity may access a virtualization service from within a respective private network on the provider network 1400 via an API 1402 to request allocation of one or more resource instances within the private network or within another private network.

Note that, although no monitoring components or security threat detection and mitigation service components are shown in FIG. 14, such components may be implemented within the control plane of storage virtualization service 1410 and/or hardware virtualization service 1420, in some embodiments. In other embodiments, such components may be implemented as part of a separate security threat detection and mitigation service on provider network 1400, and the virtualization services 1410 and/or 1420 may be clients (e.g., internal customers) of such a service.

Figure 15:
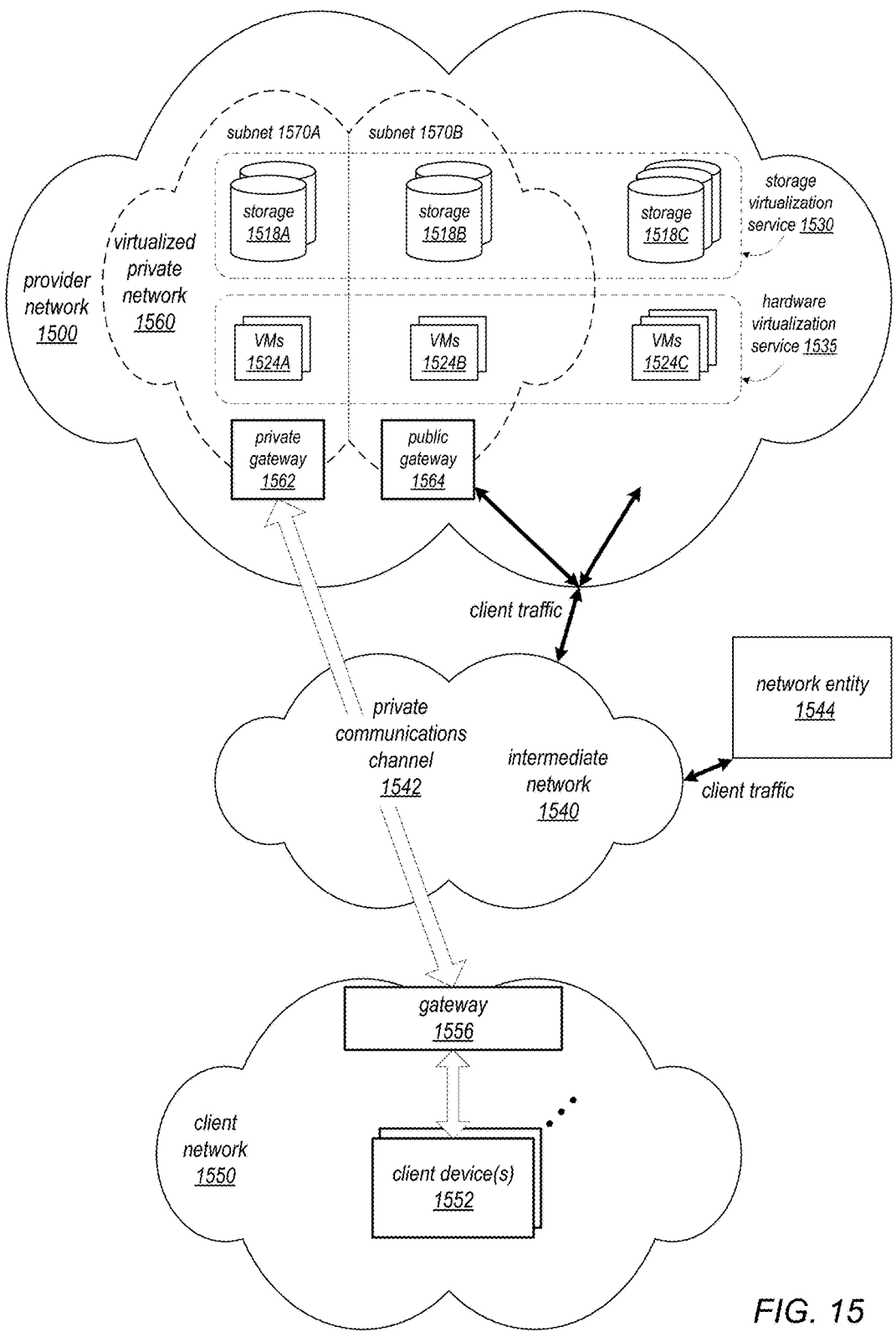
FIG. 15 is a block diagram illustrating an example provider network that provides virtualized private networks to at least some clients, according to at least some embodiments.

FIG. 15 illustrates an example provider network that provides private networks on the provider network to at least some clients, according to at least some embodiments. A client's virtualized private network 1560 on a provider network 1500, for example, enables a client to connect their existing infrastructure (e.g., devices 1552) on client network 1550 to a set of logically isolated resource instances (e.g., VMs 1524A and 1524B and storage 1518A and 1518B), and to extend management capabilities such as security services, firewalls, and intrusion detection systems to include their resource instances.

A client's virtualized private network 1560 may be connected to a client network 1550 via a private communications channel 1542. A private communications channel 1542 may, for example, be a tunnel implemented according to a network tunneling technology or some other peering connection over an intermediate network 1540. The intermediate network may, for example, be a shared network or a public network such as the Internet. Alternatively, a private communications channel 1542 may be implemented over a direct, dedicated connection between virtualized private network 1560 and client network 1550.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1560 for a client on provider network 1500, one or more resource instances (e.g., VMs 1524A and 1524B and storage 1518A and 1518B) may be allocated to the virtualized private network 1560. Note that other resource instances (e.g., storage 1518C and VMs 1524C) may remain available on the provider network 1500 for other client usage. A range of public IP addresses may also be allocated to the virtualized private network 1560. In addition, one or more networking devices (routers, switches, etc.) of the provider network 1500 may be allocated to the virtualized private network 1560. A private communications channel 1542 may be established between a private gateway 1562 at virtualized private network 1560 and a gateway 1556 at client network 1550.

In at least some embodiments, in addition to, or instead of, a private gateway 1562, virtualized private network 1560 may include a public gateway 1564 that enables resources within virtualized private network 1560 to communicate directly with entities (e.g., network entity 1544) via intermediate network 1540, and vice versa, instead of or in addition to via private communications channel 1542.

Virtualized private network 1560 may be, but is not necessarily, subdivided into two or more subnets 1570. For example, in implementations that include both a private gateway 1562 and a public gateway 1564, the private network may be subdivided into a subnet 1570A that includes resources (VMs 1524A and storage 1518A, in this example) reachable through private gateway 1562, and a subnet 1570B that includes resources (VMs 1524B and storage 1518B, in this example) reachable through public gateway 1564.

The client may assign particular client public IP addresses to particular resource instances in virtualized private network 1560. A network entity 1544 on intermediate network 1540 may then send traffic to a public IP address published by the client; the traffic is routed, by the provider network 1500, to the associated resource instance. Return traffic from the resource instance is routed, by the provider network 1500, back to the network entity 1544 over intermediate network 1540. Note that routing traffic between a resource instance and a network entity 1544 may require network address translation to translate between the public IP address and the private IP address of the resource instance.

At least some embodiments may allow a client to remap public IP addresses in a client's virtualized private network 1560 as illustrated in FIG. 15 to devices on the client's external network 1550. When a packet is received (e.g., from network entity 1544), the network 1500 may determine that the destination IP address indicated by the packet has been remapped to an endpoint on external network 1550 and handle routing of the packet to the respective endpoint, either via private communications channel 1542 or via the intermediate network 1540. Response traffic may be routed from the endpoint to the network entity 1544 through the provider network 1500, or alternatively may be directly routed to the network entity 1544 by the client network 1550. From the perspective of the network entity 1544, it appears as if the network entity 1544 is communicating with the public IP address of the client on the provider network 1500. However, the network entity 1544 has actually communicated with the endpoint on client network 1550.

While FIG. 15 shows network entity 1544 on intermediate network 1540 and external to provider network 1500, a network entity may be an entity on provider network 1500. For example, one of the resource instances provided by provider network 1500 may be a network entity that sends traffic to a public IP address published by the client.

Note that, although no monitoring components or security threat detection and mitigation service components are shown in FIG. 15 such components may be implemented within the control plane of storage virtualization service 1530 and/or hardware virtualization service 1535, in some embodiments. In other embodiments, such components may be implemented as part of a separate security threat detection and mitigation service on provider network 1500, and the virtualization services 1530 and/or 1535 may be clients (e.g., internal customers) of such a service.

Illustrative System

Figure 16:
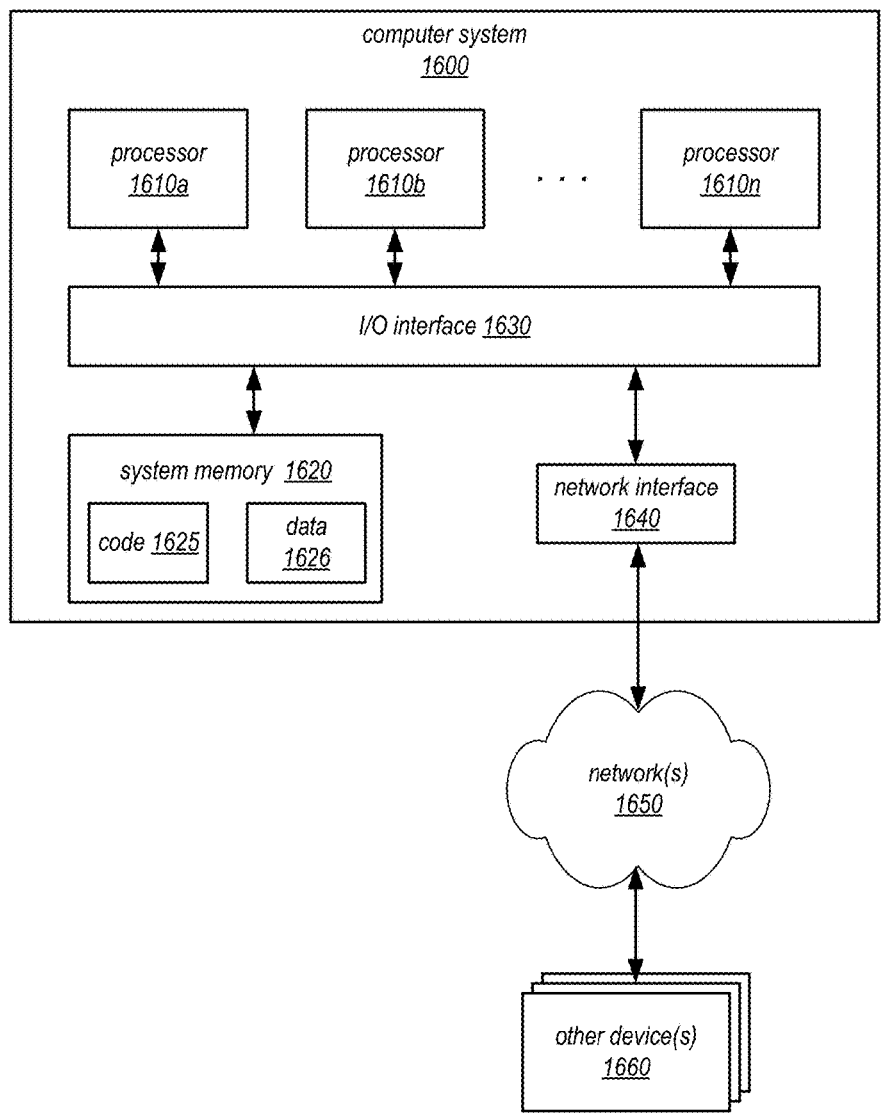
FIG. 16 is a block diagram illustrating an example computer system that is configured to implement the techniques described herein, according to at least some embodiments.

In at least some embodiments, a computing environment that implements a portion or all of the methods and apparatus described herein may include a general-purpose computer system that includes or is configured to access one or more computer-accessible media, such as computer system 1600 illustrated in FIG. 16. For example, in various embodiments, computer system 1600 may represent a node of a distributed computation system, a node of an object storage service, block-based storage service, or volume-based storage service, a computing node on a service provider system that implements security threat detection and mitigation, a client computing system, or any other type of computer system that may be employed to implement the methods and apparatus described herein. In the illustrated embodiment, computer system 1600 includes one or more processors 1610 coupled to a system memory 1620 via an input/output (I/O) interface 1630. Computer system 1600 further includes a network interface 1640 coupled to I/O interface 1630.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store instructions and data accessible by processor(s) 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the methods and apparatus described herein, are shown stored within system memory 1620 as code 1625 and data 1626. For example, at various times, data 1626 in system memory 1620 may include one or more of a data set (or portion thereof) that is to evaluated by a security threat detection and mitigation service or system, a training data set that is used to train an inference engine of a security threat detection and mitigation service or system, streaming data and/or classification data that is produced by a security threat detection and mitigation service or system, configuration or operating parameters for a security threat detection and mitigation service or system, or any other information usable when executing applications on computing resource instances of a service provide system that implements security threat detection and mitigation. In another example, at various times, code 1625 in system memory 1620 may include program instructions that are executable to implement a security threat detection and mitigation service or system (or any portion thereof), an operating system or virtual machine monitor, library or utility functions, an API or service interface, or any other program instructions that are executable to perform the methods described herein.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1650, such as other computer systems (e.g., computer systems similar to computer system 1600 or computer systems that include more, fewer, or different components than computer system 1600) or devices as illustrated and described in FIGS. 1 through 15, for example. For example, in some embodiments, computer system 1600 may represent a node of a distributed computing system that implements a security threat detection and mitigation platform, as described herein, and network interface 1640 may be configured to allow data to be exchanged between computer system 1600 and devices that implement an object data storage service, block-based storage service, or a volume-based storage service (e.g., services that are clients of the a security threat detection and mitigation platform). In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks such as Fibre Channel SANs, or via any other suitable type of network and/or protocol.

In some embodiments, system memory 1620 may be one embodiment of a computer-accessible medium configured to store program instructions and data as described above for FIGS. 1 through 15 for implementing embodiments of methods and apparatus as described herein. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A distributed computing system, comprising:
a plurality of compute nodes in a provider network, each compute node comprising at least one processor and a memory;
wherein two or more of the compute nodes host respective virtual computing resource instances on behalf of customers;
wherein the distributed computing system implements a security threat detection and mitigation platform in the provider network;
wherein the security threat detection and mitigation platform comprises a data collection layer, a data analysis layer, and a response layer;
wherein the data collection layer comprises a monitoring service:
that gathers network traffic information for traffic sent to or received by the virtual computing resource instances, wherein the network traffic information is gathered from the virtual computing resource instances distinct from the traffic, and
that serves, via one or more data streams, a representation of the gathered network traffic information to the data analysis layer;
wherein the data analysis layer comprises one or more inference engines, each configured to:
receive, from the data collection layer, via the one or more data streams, the representation of the gathered network traffic information, and
detect security threats of a respective security threat type dependent, at least in part, on the gathered network traffic information, and at least one of which applies machine learning to the classification of observed events as being malicious or benign; and
wherein the response layer comprises one or more response modules, each configured to take a respective action in response to receipt of an indication that a given one of the one or more inference engines has detected a security threat associated with one of the virtual computing resource instances.

2. The distributed computing system of claim 1, wherein the representation of the gathered network traffic information comprises information that has been filtered, aggregated, or organized for consumption by at least one of the one or more inference engines.

3. The distributed computing system of claim 1, wherein the representation of the gathered network traffic information is served as one or more streams of individual records, each stream comprising network traffic information gathered during a specified time period, to one or more of the one or more inference engines.

4. The distributed computing system of claim 1, wherein another one of the one or more inference engines applies heuristics that are dependent, at least in part, on the gathered network traffic information to the classification of observed events as being malicious or benign.

5. The distributed computing system of claim 1,
wherein the data collection layer further comprises one or more agents that gather data of one or more other types and that serve representations of the other types of data to the data analysis layer; and
wherein the other types of data comprise one or more of: data representing a reputation associated with one of the virtual computing resource instances or with an internet protocol (IP) address, data representing an authorization history for one of the virtual computing resource instances, data representing an IP address ownership age, statistics about data emitted by one of the virtual computing resource instances, statistics about data emitted by a machine that hosts one of the virtual computing resource instances, or statistics about data emitted by an application executing on one of the virtual computing resource instances.

6. The distributed computing system of claim 1,
wherein at least one of the response modules is configured to initiate performance of a security threat mitigation action automatically and without human intervention in response to receipt of an indication that the given one of the one or more inference engines has detected a security threat; and
wherein the security threat mitigation action comprises an action that throttles traffic originating from the one of the virtual computing resource instances, blocks traffic originating from the one of the virtual computing resource instances, or disconnects the one of the virtual computing resource instances from a network over which is communicates with one or more other network endpoints.

7. A method, comprising:
performing, by one or more computers in a provider network:
receiving, by a data analysis layer, a data stream from a data collection layer that gathers network traffic information for traffic sent to or received by a virtual computing resource instance hosted on a computer in the provider network, wherein the virtual computing resource instance is at a network-addressable endpoint sending or receiving network traffic, and the data stream is distinct from the network traffic and contains data that pertains to the network traffic;
analyzing at least a portion of the data stream, wherein the at least a portion of the data stream comprises a statistical-analysis-driven digest of at least some of the information within the data stream that was received from the virtual computing resource instance;
classifying behavior of the virtual computing resource instance with respect to a security threat of a particular type dependent on said analyzing, wherein said classifying is further dependent on a previous application of a machine learning technique to training data associated with one or more known security threats of the particular type; and
taking action, in response to classifying the behavior as malicious with respect to the security threat, to mitigate the security threat.

8. The method of claim 7, wherein the data stream comprises one or more types of data representing, during a specified time period: a number of packets sent from the virtual computing resource instance, a number of packets received by the virtual computing resource instance, an internet protocol (IP) address of a source of one or more packets, an IP address of a destination of one or more packets, a source port for one or more packets, or a destination port for one or more packets.

9. The method of claim 7, wherein the data stream comprises one or more of: data representing a reputation associated with the virtual computing resource instance or with its internet protocol (IP) address, data representing an authorization history for the virtual computing resource instance, data representing an IP address ownership age, data extracted from one or more packet headers, statistics about data emitted by the virtual computing resource instance, statistics about data emitted by a machine that hosts the virtual computing resource instance, or statistics about data emitted by an application executing on the virtual computing resource instance.

10. The method of claim 7, further comprising:
receiving another data stream from a different virtual computing resource instance;
analyzing at least a portion of the other data stream;
classifying behavior of the different virtual computing resource instance with respect to a security threat of a different type dependent on analyzing the at least a portion of the other data stream, wherein classifying the behavior of the different virtual computing resource instance comprises applying one or heuristics to the at least a portion of the other data stream; and
taking a different action, in response to classifying the behavior as malicious with respect to the security threat of the different type, to mitigate the security threat of the different type.

11. The method of claim 10,
wherein said classifying is performed by an inference engine of a security threat detection and mitigation platform;
wherein the method further comprises:
introducing, prior to said classifying the behavior of the different virtual computing resource instance, another inference engine into the security threat security threat detection and mitigation platform; and
wherein said classifying the behavior of the different virtual computing resource instance is performed by the other inference engine.

12. The method of claim 7,
wherein said classifying is performed by one of a plurality of inference engines of a security threat detection and mitigation platform; and
wherein said classifying comprises:
generating, by another one of the plurality of inference engines, an initial inference result;
feeding, by the other one of the plurality of inference engines to the one of the plurality of inference engines, the initial inference result; and
generating, by the one of the inference engines and dependent on the initial inference result, a classification result for the behavior of the virtual computing resource instance with respect to a security threat of the particular type.

13. The method of claim 7, wherein the security threat comprises a denial of service attack, a botnet command and control system, an unauthorized network scan, an unauthorized port scan, an unauthorized horizontal scan, an unauthorized probe, a phishing attack, a secure shell intrusion, or a remote desktop attack.

14. The method of claim 7,
wherein the method further comprises, prior to said classifying, feeding the training data associated with the one or more known security threats of the particular type to a machine learning engine to generate a classification predictor;
wherein said classifying is performed by the classification predictor; and
wherein the method further comprises, subsequent to said classifying:
determining that classifying the behavior as malicious with respect to the security threat was incorrect;
providing, to the machine learning engine, the data stream and an indication that classifying the behavior as malicious with respect to the security threat was incorrect; and
updating, by the machine learning engine and dependent on the data stream and the indication that classifying the behavior as malicious with respect to the security threat was incorrect, the classification predictor.

15. The method of claim 7,
wherein said receiving comprises receiving a data stream from a data collection agent of a security threat detection and mitigation platform that is executing on the virtual computing resource instance; and
wherein the method further comprises:
introducing another data collection agent into the security threat detection and mitigation platform, wherein the other data collection agent executes on the virtual computing resource instance; and
receiving another data stream from the other data collection agent;
wherein the data stream received from the data collection agent and the data stream received from the other data collection agent comprise data of different types that are associated with the virtual computing resource instance.

16. The method of claim 7,
wherein said taking action to mitigate the security threat is performed by a response module of a security threat detection and mitigation platform;
wherein the method further comprises, prior to said taking action to mitigate the security threat, introducing another response module into the security threat detection and mitigation platform;
wherein actions taken by the response module are of a different type than actions taken by the other response module.

17. The method of claim 16, further comprising, prior to said taking action to mitigate the security threat, determining that said taking action to mitigate the security threat is to be performed by the response module rather than the other response module, wherein said determining is dependent on the particular type of the security threat.

18. The method of claim 7, further comprising, subsequent to said classifying:
storing the at least a portion of the data stream and an indication that the behavior was classified as malicious with respect to the security threat in a data store;
retrieving the at least a portion of the data stream and the indication that the behavior was classified as malicious with respect to the security threat; and
analyzing the correctness of said classifying dependent on the retrieved at least a portion of the data stream and the retrieved indication that the behavior was classified as malicious with respect to the security threat.

19. A non-transitory computer-accessible storage medium storing program instructions that when executed on one or more computers in a multi-tenant virtual computing environment, cause the one or more computers to:
receive, by a data analysis layer and via one or more data streams from a data collection layer that gathers network traffic information for traffic sent to or received by one or more virtual computing resource instances hosted in the multi-tenant virtual computing environment, a statistical-analysis-driven representation of network traffic information or system telemetry information associated with the one or more virtual computing resources instances, wherein the network traffic information or system telemetry information is gathered from the virtual computing resource instances and wherein the data stream is distinct from network traffic sent or received by the virtual computing resource instances;
detect, via the data analysis layer comprising one or more inference engines, events of a respective event type dependent, at least in part, on the statistical-analysis-driven representation of the gathered information, and at least one of which applies machine learning to the classification of detected events; and
provide, to a response layer, an indication that a given one of the one or more inference engines has detected an event of a particular type that is associated with one of the one or more virtual computing resource instances, wherein the indication causes the response layer to take a predetermined action.

20. The non-transitory computer-accessible storage medium of claim 19, wherein the program instructions when executed on the one or more computers cause the one or more computers to:
implement a plurality of different inference engines configured to detect different types of events from the statistical-analysis-driven representation of the gathered information.

21. The non-transitory computer-accessible storage medium of claim 19, wherein to detect one or more events, the program instructions when executed on the one or more computers cause the one or more computers to:
analyze, via an inference engine, one or more extracted features of interest with respect to events of a particular event type from packet headers within a subset of the packets seen in network traffic sent or received by a virtual computing resource instance.

22. The non-transitory computer-accessible storage medium of claim 19, wherein the program instructions when executed on the one or more computers cause the one or more computers to:
implement an application programming interface (API) configured to receive requests,
wherein the API defines a plurality of request types, including a request type to introduce a functional component into the data collection layer, the data analysis layer, or the response layer, or another request type to configure communications with a client.

* * * * *